(12) United States Patent
Matsushima et al.

(10) Patent No.: US 12,019,789 B2
(45) Date of Patent: *Jun. 25, 2024

(54) PROGRAM EXECUTION DEVICE

(71) Applicant: Panasonic Holdings Corporation, Osaka (JP)

(72) Inventors: Hideki Matsushima, Tokyo (JP); Teruto Hirota, Tokyo (JP); Yukie Shoda, Osaka (JP); Shunji Harada, Osaka (JP)

(73) Assignee: Panasonic Holdings Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,969

(22) Filed: Apr. 7, 2023

(65) Prior Publication Data

US 2023/0306145 A1  Sep. 28, 2023

Related U.S. Application Data

(60) Continuation of application No. 17/193,091, filed on Mar. 5, 2021, now Pat. No. 11,651,113, which is a
(Continued)

(30) Foreign Application Priority Data

Aug. 26, 2003  (JP) ................. 2003-301554

(51) Int. Cl.
*G06F 21/87* (2013.01)
*G06F 12/14* (2006.01)
(Continued)

(52) U.S. Cl.
CPC .......... *G06F 21/87* (2013.01); *G06F 12/1408* (2013.01); *G06F 21/10* (2013.01);
(Continued)

(58) Field of Classification Search
CPC ...... G06F 21/87; G06F 12/1408; G06F 21/10; G06F 21/14; G06F 21/52; G06F 21/53;
(Continued)

(56) References Cited

U.S. PATENT DOCUMENTS 4,558,176 A   12/1985  Arnold et al.
4,590,552 A   5/1986   Guttag et al.
(Continued)

FOREIGN PATENT DOCUMENTS

CN   1191644     8/1998
EP   1 191 423   3/2002
(Continued)

OTHER PUBLICATIONS

US 10,970,472 B2, 04/2021, Matsushima (withdrawn)
(Continued)

*Primary Examiner* — Christopher A Revak
(74) *Attorney, Agent, or Firm* — WENDEROTH, LIND & PONACK L.L.P.

(57) ABSTRACT

A program execution device capable of protecting a program against unauthorized analysis and alteration is provided. The program execution device includes an execution unit, a first protection unit, and a second protection unit. The execution unit executes a first program and a second program, and is connected with an external device that is capable of controlling the execution. The first protection unit disconnects the execution unit from the external device while the execution unit is executing the first program. The second protection unit protects the first program while the execution unit is executing the second program.

8 Claims, 19 Drawing Sheets

Related U.S. Application Data continuation of application No. 16/776,869, filed on Jan. 30, 2020, now Pat. No. 10,970,424, which is a continuation of application No. 16/393,313, filed on Apr. 24, 2019, now Pat. No. 10,607,036, which is a continuation of application No. 15/964,720, filed on Apr. 27, 2018, now Pat. No. 10,318,768, which is a continuation of application No. 15/719,850, filed on Sep. 29, 2017, now Pat. No. 10,108,821, which is a continuation of application No. 15/348,035, filed on Nov. 10, 2016, now Pat. No. 9,811,691, which is a continuation of application No. 14/941,987, filed on Nov. 16, 2015, now Pat. No. 9,524,404, which is a continuation of application No. 14/483,450, filed on Sep. 11, 2014, now Pat. No. 9,218,485, which is a continuation of application No. 13/952,244, filed on Jul. 26, 2013, now Pat. No. 8,874,938, which is a continuation of application No. 13/441,261, filed on Apr. 6, 2012, now Pat. No. 8,522,053, which is a division of application No. 12/367,076, filed on Feb. 6, 2009, now Pat. No. 8,181,040, which is a continuation of application No. 10/569,414, filed as application No. PCT/JP2004/012666 on Aug. 26, 2004, now Pat. No. 7,533,276.

(51) Int. Cl.
| | | |
|---|---|---|
| *G06F 21/10* | | (2013.01) |
| *G06F 21/14* | | (2013.01) |
| *G06F 21/52* | | (2013.01) |
| *G06F 21/53* | | (2013.01) |
| *G06F 21/57* | | (2013.01) |
| *G06F 21/74* | | (2013.01) |
| *H04L 9/32* | | (2006.01) |
| *H04L 9/40* | | (2022.01) |

(52) U.S. Cl.
CPC .............. *G06F 21/14* (2013.01); *G06F 21/52* (2013.01); *G06F 21/53* (2013.01); *G06F 21/57* (2013.01); *G06F 21/74* (2013.01); *H04L 9/3234* (2013.01); *H04L 9/3247* (2013.01); *H04L 63/105* (2013.01); *G06F 2212/1052* (2013.01); *G06F 2221/2153* (2013.01)

(58) Field of Classification Search
CPC .. G06F 21/57; G06F 21/74; G06F 2212/1052; G06F 2221/2153; G06F 21/00; G06F 1/00; H04L 9/3234; H04L 9/3247; H04L 63/105
See application file for complete search history.

(56) References Cited

U.S. PATENT DOCUMENTS

| | | | |
|---|---|---|---|
| 5,475,826 | A | 12/1995 | Fischer |
| 5,915,025 | A | 6/1999 | Taguchi et al. |
| 5,944,821 | A | 8/1999 | Angelo |
| 5,969,632 | A | 10/1999 | Diamant et al. |
| 5,991,399 | A | 11/1999 | Graunke et al. |
| 6,094,724 | A | 7/2000 | Benhammou et al. |
| 6,149,522 | A | 11/2000 | Alcorn et al. |
| 6,202,153 | B1 | 3/2001 | Diamant et al. |
| 6,268,789 | B1 | 7/2001 | Diamant et al. |
| 6,374,402 | B1 | 4/2002 | Schmeidler et al. |
| 6,606,707 | B1 | 8/2003 | Hirota et al. |
| 6,789,192 | B2 | 9/2004 | HIrota et al. |
| 6,925,570 | B2 | 8/2005 | Freeman et al. |
| 6,938,164 | B1 | 8/2005 | England et al. |
| 7,043,641 | B1 | 5/2006 | Martinek et al. |
| 7,062,652 | B2 | 6/2006 | HIrota et al. |
| 7,099,479 | B1 | 8/2006 | Ishibashi et al. |
| 7,143,445 | B1 | 11/2006 | Ishiguro et al. |
| 7,228,423 | B2 | 6/2007 | Asai et al. |
| 7,240,345 | B2 | 7/2007 | Sueyoshi et al. |
| 7,254,707 | B2 | 8/2007 | Herbert et al. |
| 7,478,248 | B2 | 1/2009 | Ziv et al. |
| 7,533,276 | B2 | 5/2009 | Matsushima et al. |
| 7,657,760 | B2 | 2/2010 | Teramoto et al. |
| 7,845,005 | B2 | 11/2010 | Kelley et al. |
| 8,181,040 | B2 | 5/2012 | Matsushima et al. |
| 8,522,053 | B2 | 8/2013 | Matsushima et al. |
| 8,549,631 | B2 | 10/2013 | Lee |
| 8,695,060 | B2 | 4/2014 | Wade et al. |
| 8,874,938 | B2 | 10/2014 | Matsushima et al. |
| 9,135,418 | B2 | 9/2015 | Wade et al. |
| 9,165,139 | B2 | 10/2015 | Wade et al. |
| 9,218,485 | B2 | 12/2015 | Matsushima et al. |
| 9,524,404 | B2 | 12/2016 | Matsushima et al. |
| 9,811,691 | B2 | 11/2017 | Matsushima et al. |
| 10,108,821 | B2 | 10/2018 | Matsushima |
| 10,318,768 | B2 | 6/2019 | Matsushima |
| 10,521,613 | B1 * | 12/2019 | Gonzalez .............. G06F 21/552 |
| 10,607,036 | B2 | 3/2020 | Marsushima |
| 11,651,113 | B2 * | 5/2023 | Matsushima ......... H04L 9/3247 713/194 |
| 2001/0018736 | A1 | 8/2001 | Hashimoto et al. |
| 2001/0056539 | A1 | 12/2001 | Pavlin et al. |
| 2002/0003883 | A1 | 1/2002 | Noda et al. |
| 2002/0051536 | A1 | 5/2002 | Shirakawa et al. |
| 2002/0101995 | A1 | 8/2002 | Hashimoto et al. |
| 2002/0144138 | A1 | 10/2002 | Maliszewski |
| 2002/0157002 | A1 | 10/2002 | Messerges et al. |
| 2002/0174342 | A1 | 11/2002 | Freeman et al. |
| 2003/0033537 | A1 | 2/2003 | Fujimoto et al. |
| 2003/0037237 | A1 | 2/2003 | Abgrall et al. |
| 2003/0114144 | A1 | 6/2003 | Minemura |
| 2003/0140244 | A1 | 7/2003 | Dahan et al. |
| 2003/0221103 | A1 | 11/2003 | HIrota et al. |
| 2004/0039924 | A1 | 2/2004 | Baldwin et al. |
| 2005/0005149 | A1 | 1/2005 | HIrota et al. |
| 2005/0173518 | A1 | 8/2005 | Takayama |
| 2005/0182961 | A1 | 8/2005 | Timmermans et al. |
| 2006/0010329 | A1 | 1/2006 | Aaron |
| 2006/0041759 | A1 | 2/2006 | Kaliski, Jr. et al. |
| 2006/0101136 | A1 | 5/2006 | Akashika et al. |
| 2006/0129819 | A1 | 6/2006 | HIrota et al. |
| 2006/0155880 | A1 | 7/2006 | Elnozahy et al. |
| 2007/0288922 | A1 | 12/2007 | Sueyoshi et al. |
| 2007/0294534 | A1 | 12/2007 | Asai et al. |
| 2008/0046737 | A1 | 2/2008 | Mihm et al. |
| 2008/0046763 | A1 | 2/2008 | Teramoto et al. |
| 2008/0077767 | A1 | 3/2008 | Khosravi et al. |
| 2008/0115210 | A1 | 5/2008 | HIrota et al. |
| 2009/0013196 | A1 | 1/2009 | Ito et al. |
| 2009/0019551 | A1 | 1/2009 | Haga et al. |
| 2009/0147529 | A1 | 6/2009 | Ajiki et al. |
| 2011/0126285 | A1 | 5/2011 | Lee et al. |
| 2012/0166807 | A1 | 6/2012 | Shear |
| 2013/0004142 | A1 | 1/2013 | Grab et al. |
| 2013/0007471 | A1 | 1/2013 | Grab et al. |
| 2018/0096143 | A1 * | 4/2018 | Xiaoning ................ G06F 21/53 |
| 2020/0084032 | A1 | 3/2020 | Brickell |

FOREIGN PATENT DOCUMENTS

| | | |
|---|---|---|
| JP | 9-231068 | 9/1997 |
| JP | 2002-202720 | 7/2002 |
| JP | 2002-232417 | 8/2002 |
| JP | 2002-244757 | 8/2002 |
| JP | 2002-526822 | 8/2002 |
| JP | 2002-279376 | 9/2002 |
| JP | 2002-358137 | 12/2002 |
| JP | 2003-223235 | 8/2003 |
| JP | 2003-233795 | 8/2003 |
| JP | 2005-18725 | 1/2005 |
| JP | 2009-231068 | 10/2009 |
| KR | 2002-0079349 | 10/2002 |
| WO | 97/01902 | 1/1997 |

(56) References Cited

FOREIGN PATENT DOCUMENTS

| WO | 00/19299 | 4/2000 |
|---|---|---|
| WO | 01/97010 | 12/2001 |
| WO | 2004/013744 A2 | 2/2004 |

OTHER PUBLICATIONS

International Search Report dated May 11, 2005 in the International (PCT) Application No. PCT/JP2004/012666.
International Preliminary Report on Patentability dated Dec. 20, 2005 in the International (PCT) Application No. PCT/JP2004/012666.
David Aucsmith et al., "Details of Tamper Resistant Technology for Software", Nikkei Electronics, Jan. 5, 1998 (No. 706), pp. 209-220.
Hiroyuki Ishima et al., "Tamper Resistant Technology for Software", Fuji Xerox Technical Report, No. 13, pp. 20-28 (along with English Abstract).
Extended European Search Report dated Jun. 13, 2016 in corresponding European Application No. 15195523.4.
European Patent Office Summons to attend oral proceedings issued Apr. 20, 2018 in connection with corresponding European Application No. 04772622.9.
Office Action dated Mar. 7, 2019 in European Patent Application No. 15 195 523.4.
Summons to attend Oral Proceedings dated Jan. 17, 2020 in European Patent Application No. 15 195 523.4.
Menezes et al.: Handbook of Applied Cryptography—Chapters 9-10, Jan. 1, 1997 (Jan. 1, 1997), CRC Press LLC, USA, XP05510492, pp. 321-424.
Telephone Conversation issued Jul. 3, 2020 in corresponding European Patent Application No. 15 195 523.4.

* cited by examiner

FIG.11

| RESET | BL0x0000AAAA |
|---|---|
| UNDEFINED INSTRUCTION | BL0xAAAA0000 |
| INTERRUPT | BL0xBBBB0000 |
| ABORT | BL0xCCCC0000 |
| SOFTWARE INTERRUPT | BL0xDDDD0000 |
| ⋮ | ⋮ |

PROGRAM EXECUTION DEVICE

BACKGROUND OF THE INVENTION

Technical Field

The present invention relates to techniques of protecting programs against unauthorized alteration and analysis.

Background Art

In recent years, the widespread use of PCs and the Internet makes it possible to copy or edit digital content such as software easily. This being so, tamper-resistant techniques are needed to protect software against unauthorized alteration and analysis.

Research has long been performed on tamper-resistant techniques. For example, an article "Protecting Software against Inverse Analysis and Falsification" in Nikkei Electronics, Jan. 5, 1998, pp. 209-220 describes basic principles and concrete methods for preventing unauthorized software analysis. Also, an article "Software Tamper-resistant Techniques" in Fuji Xerox Technical Report, No. 13, pp. 20-28 deals with technical problems and measures concerning prevention of unauthorized software analysis.

Despite this research, more various techniques for protecting programs against malicious users are still needed.

SUMMARY OF THE INVENTION

In view of the above problem, the present invention aims to provide a program execution device that can execute a program securely by preventing unauthorized alteration and analysis.

The above aim can be achieved by a program execution device that executes a first secure program which runs in a first security level and a second secure program which runs in a second security level lower than the first security level, including: an execution unit operable to operate by switching between a first mode which is in the first security level and a second mode which is in the second security level; an external device disconnection unit operable to disconnect the execution unit from an external device according to an instruction of the first secure program; and a protection unit operable to protect the second secure program. According to this construction, programs can be protected from both external attacks using hardware and attacks using software. Also, a high level of security can be achieved by disconnecting the external device.

Here, the program execution device may further include an interrupt detection unit operable to detect an interrupt, wherein the protection unit includes a memory area in which the execution unit writes data when operating according to the second secure program, and when the interrupt detection unit detects an interrupt while the execution unit is operating according to the second secure program, the protection unit encrypts the data written in the memory area, and, after the execution unit finishes processing the interrupt, decrypts the encrypted data in the memory area before the execution unit resumes operating according to the second secure program. According to this construction, the data in the memory area is encrypted before control is transferred from the second secure program to another program. In this way, the data used by the second secure program can be protected from other programs, with it being possible to prevent unauthorized analysis of the second secure program using software. Also, memory usage can be reduced by encrypting only the data in the memory area. This enables a device, e.g. a mobile telephone or a PDA, whose resources such as the CPU processing speed and the memory capacity are limited, to maintain a high level of security.

Here, the second secure program may include a call instruction for calling the first secure program, wherein the execution unit, according to the call instruction, passes the second tamper detection value, a start address of the at least one part of the second secure program, and a size of the at least one part of the second secure program, to the first secure program.

Here, before the execution unit executes the call instruction, the protection unit may disable interrupt processing by the execution unit, wherein the execution unit, (a) according to the call instruction, passes an encrypted program key to the first secure program, (b) according to the first secure program, decrypts the encrypted program key received from the second secure program using a master key included in the first secure program, and passes the decrypted program key to the second secure program, if the first tamper detection value and the second tamper detection value are same, and (c) according to the second secure program, decrypts an encrypted part of the second secure program using the decrypted program key received from the first secure program, and then deletes the decrypted program key, and after the execution unit deletes the decrypted program key, the protection unit enables the interrupt processing by the execution unit.

According to these constructions, no interrupt is accepted until the program key for decrypting the encrypted program is deleted. Thus, the program key is protected from unauthorized analysis which is performed by means of an interrupt, with it being possible to prevent unauthorized analysis of the second secure program.

Here, the execution unit, according to the first secure program, may perform a hash operation on at least one part of the second secure program using a secret key to calculate a first tamper detect ion value, compare the first tamper detection value with a second tamper detection value which has been calculated based on the at least one part of the second secure program upon generation of the second secure program, and terminate the operation if the first tamper detection value and the second tamper detection value are different, and continue the operation if the first tamper detection value and the second tamper detection value are same.

According to this construction, the execution unit terminates the operation if the second secure program is judged as being tampered with. This minimizes damage in the case where the second secure program has been tampered with.

Also, the second secure program contains a tamper detection value generated based on at least one part of the second secure program. This being so, when the second secure program needs to be changed such as when the second secure program has been tampered with, the change can be made to the second secure program alone without changing other processing means of the program execution device.

BRIEF DESCRIPTION OF DRAWINGS

FIG. 11 shows a data structure of a vector table shown in FIG. 6.

DETAILED DESCRIPTION OF THE INVENTION

The following describes an embodiment of the present invention in detail, with reference to drawings.

1. Construction of a Secure Processing System 1

Figure 1:
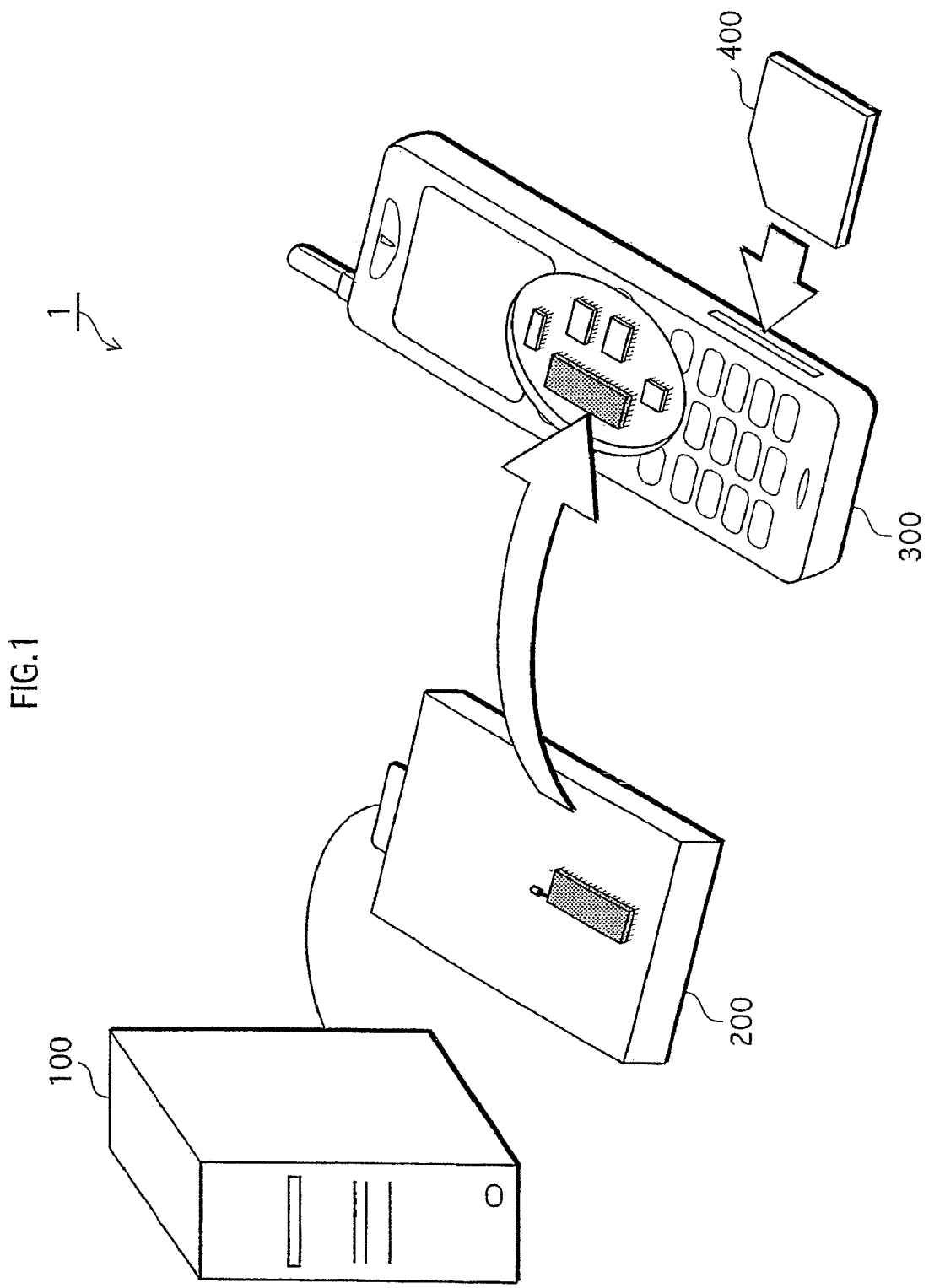
FIG. 1 shows an overall construction of a secure processing system to which an embodiment of the present invention relates.

FIG. 1 shows an overall construction of a secure processing system 1 to which the embodiment of the present invent ion relates. In the drawing, the secure processing system 1 is roughly made up of a certificate authority device 100, a ROM writer 200, a portable terminal 300, and a memory card 400.

The secure processing system 1 protects a program which is executed in the portable terminal 300 from unauthorized analysis and alteration. The program to be protected is generated in the certificate authority device 100 and written to a ROM by the ROM writer 200. The ROM carrying the program is then installed in the portable terminal 300.

In this embodiment, the program to be protected is an encrypted music data decryption program for decrypting encrypted music data recorded on the memory card 400, as one example.

1.1. Certificate Authority Device 100

Figure 7:
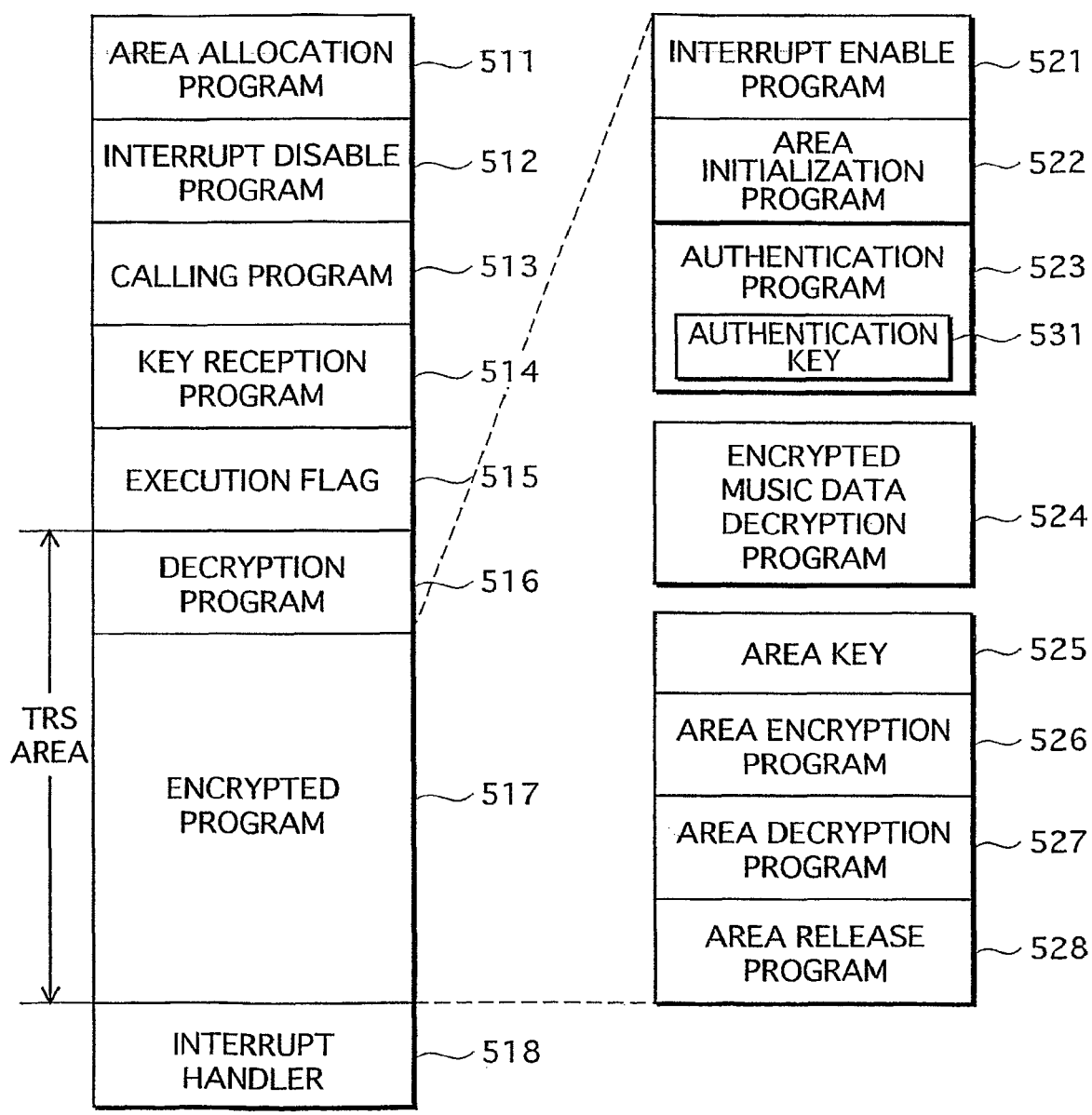
FIG. 7 shows a data structure of a second secure processing program shown in FIG. 6.

The certificate authority device 100 generates a second secure processing program that includes an area allocation program 511, an interrupt di sable program 512, a calling program 513, a key reception program 514, an execution flag 515, an interrupt handler 518, a decryption program 516, and a secure program shown in FIG. 7. The secure program includes an encrypted music data decryption program 524 which needs to be protected. The generated second secure processing program is written on the ROM by the ROM writer 200 and installed in the portable terminal 300. Each of the programs is described in detail later.

Figure 2:
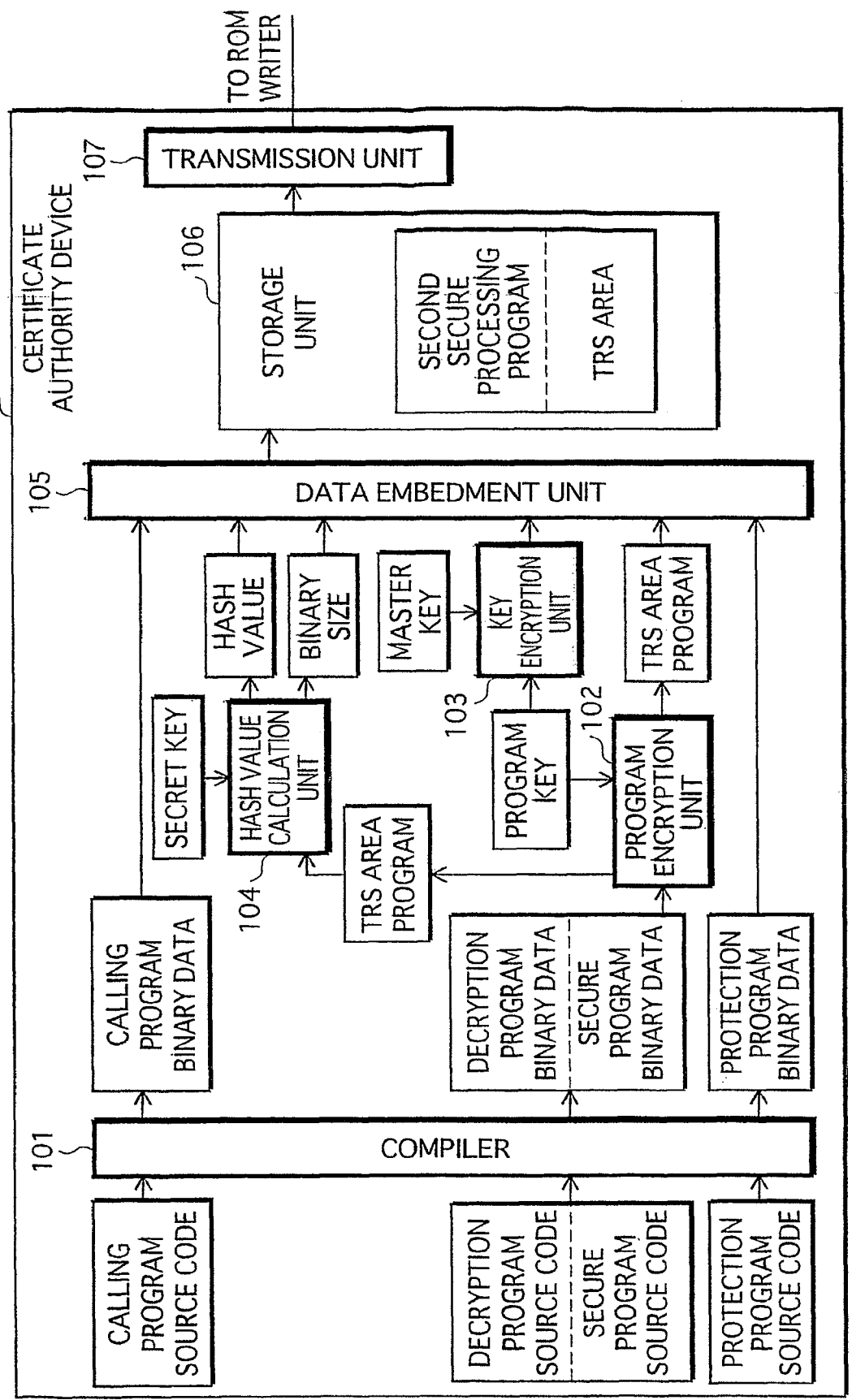
FIG. 2 is a block diagram showing a construction of a certificate authority device shown in FIG. 1.

FIG. 2 shows a construction of the certificate authority device 100. In the drawing, the certificate authority device 100 includes a compiler 101, a program encryption unit 102, a key encryption unit 103, a hash value calculation unit 104, a data embedment unit 105, a storage unit 106, and a transmission unit 107.

The certificate authority device 100 is actually realized by a computer system that includes a microprocessor, a ROM, a RAM, a hard disk unit, a display unit, and a keyboard. The functions of the certificate authority device 100 are realized by the microprocessor executing a computer program stored on the RAM or the hard disk unit.

(1) Compiler 101

The compiler 101 receives an input of source code of a protection program, the calling program 513, the decryption program 516, and the secure program. The protection program is made up of the area allocation program 511, the interrupt disable program 512, the key reception program 514, the execution flag 515, and the interrupt handler 518. The calling program 513 is used for sending data that is needed to detect whether the second secure processing program has been tampered with. The calling program 513 contains a start address of a TRS area program on a memory of the portable terminal 300. The TRS area program corresponds to the decryption program 516 and an encrypted program 517 of the second secure processing program. The encrypted program 517 is generated by encrypting the secure program.

Upon receiving the source code of the calling program 513, the decryption program 516, the secure program, and the protection program, the compiler 101 compiles each of the programs.

Figure 3:
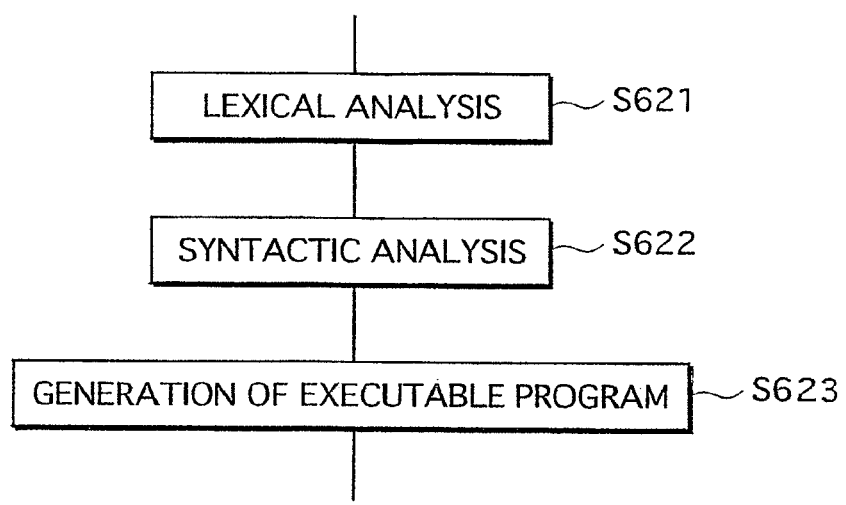
FIG. 3 is a flowchart showing an operation of a compiler shown in FIG. 2.

FIG. 3 is a flowchart showing an operation of compiling a program by the compiler 101.

The compiler 101 performs lexical analysis (S621) and syntactic analysis (S622). Finally, the compiler 101 generates binary data representing a program that is executable by a computer (S623).

The compiler 101 outputs binary data of the calling program 513 and binary data of the protection program to the data embedment unit 105. The compiler 101 also outputs binary data of the decryption program 516 and binary data of the secure program to the program encryption unit 102.

(2) Program Encryption Unit 102

The program encryption unit 102 receives the binary data of the decryption program 516 and the binary data of the secure program. The program encryption unit 102 also receives a program key. The program encryption unit 102 encrypts the secure program using the program key according to encryption algorithm E1, to generate the encrypted program 517. As one example, encryption algorithm E1 is an AES (Advanced Encryption Standard) algorithm. AES is well known in the art and so its explanation has been omitted here. Algorithms other than AES may also be used as encryption algorithm E1.

The program encryption unit 102 outputs the decryption program 516 and the encrypted program 517 to the data embedment unit 105 as the TRS area program.

The program encryption unit 102 also outputs the TRS area program to the hash value calculation unit 104.

(3) Key Encryption Unit 103

The key encryption unit 103 receives the program key and a master key.

The key encryption unit 103 encrypts the program key using the master key according to encryption algorithm E1, to generate an encrypted key. The key encryption unit 103 outputs the encrypted key to the data embedment unit 105.

(4) Hash Value Calculation Unit 104

The hash value calculation unit 104 calculates a hash value of at least one part of the second secure processing program.

In this embodiment, the hash value calculation unit 104 receives the TRS area program and a secret key, and calculates a hash value of the TRS area program using the secret key according to a hash function.

For example, an algorithm used for HMAC (Keyed-Hashing for Message Authentication) may be used to calculate the hash value.

Let H be a hash function, K be a secret key, text be data to be hashed, opad be a character string made up of 64 number of byte values Ox36, and ipad be a character string made up of 64 number of byte values Ox5C. This being the case, an algorithm for calculating a hash value can be expressed as H (K XOR opad, H (K XOR ipad, text)).

The hash value calculation unit 104 also calculates a binary size of the TRS area program.

The hash value calculation unit 104 outputs the hash value and the binary size to the data embedment unit 105.

(5) Data Embedment Unit 105

The data embedment unit 105 receives the binary data of the calling program 513 and the binary data of the protection program from the compiler 101, and the hash value and the binary size from the hash value calculation unit 104. The data embedment unit 105 also receives the encrypted key from the key encryption unit 103, and the TRS area program from the program encryption unit 102.

The data embedment unit 105 embeds the hash value in the calling program 513 as a tamper detection value. The data embedment unit 105 also embeds the binary size and the encrypted key in the calling program 513. The data embedment unit 105 includes the resulting calling program 513 into the protection program, and combines the protection program and the TRS area program to form the second secure processing program. The data embedment unit 105 writes the second secure processing program to the storage unit 106.

(6) Storage Unit 106

The storage unit 106 stores the second secure processing program written by the data embedment unit 105.

(7) Transmission Unit 107

The transmission unit 107 outputs the second secure processing program stored in the storage unit 106, to the ROM writer 200.

1.2. ROM Writer 200

The ROM writer 200 is connected with the certificate authority device 100. The ROM writer 200 receives the second secure processing program from the certificate authority device 100, and writes the second secure processing program to the ROM. The ROM on which the second secure processing program is written by the ROM writer 200 is then installed in the portable terminal 300.

1.3. Memory Card 400

Figure 4:
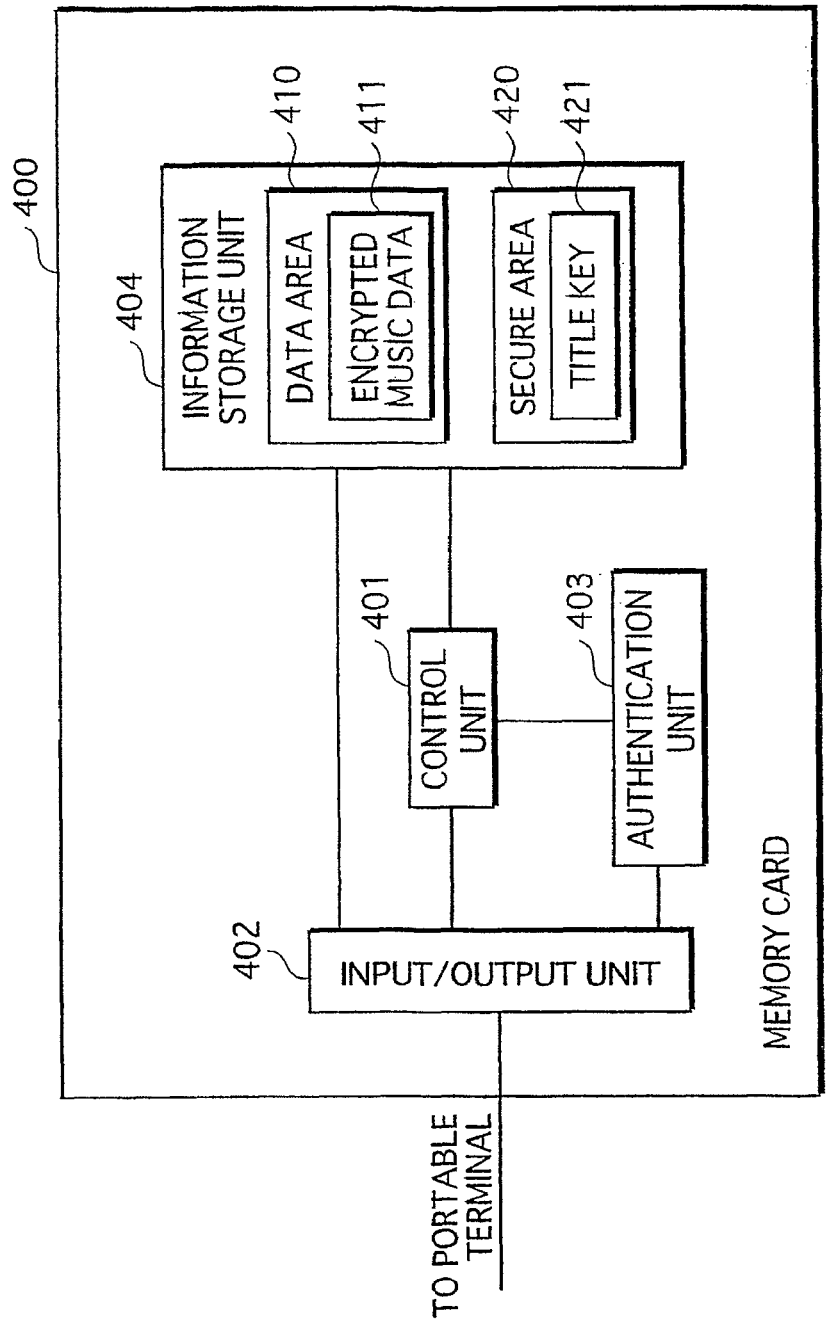
FIG. 4 is a block diagram showing a construction of a memory card shown in FIG. 1.

FIG. 4 shows a construction of the memory card 400. In the drawing, the memory card 400 includes a control unit 401, an input/output unit 402, an authentication unit 403, and an information storage unit 404.

(1) Input/Output Unit 402

The input/output unit 402 performs transfer of data between the control unit 401 and the portable terminal 300, when the memory card 400 is connected to the portable terminal 300.

(2) Information Storage Unit 404

The information storage unit 404 has a data area 410 and a secure area 420.

The data area 410 stores encrypted music data 411. The encrypted music data 411 is generated by encrypting MP3 music data using a title key 421 according to encryption algorithm E1.

The secure area 420 stores the title key 421. The portable terminal 300 can access the secure area 420 only when it has succeeded in mutual authentication with the authentication unit 403.

Here, data which is stored in the information storage unit 404 may be encrypted using information unique to the memory card 400.

(3) Authentication Unit 403

The authentication unit 403 performs mutual authentication with the portable terminal 300 based on CPRM (Content Protection for Recordable Media). If the mutual authentication is successful, the authentication unit 403 establishes a shared key with the portable terminal 300, and outputs the shared key to the control unit 401. CPRM is well known in the art and so its explanation has been omitted here. Methods other than CPRM may also be used for the mutual authentication.

(4) Control Unit 401

The control unit 401 performs transfer of data with the portable terminal 300 via the input/output unit 402. The control unit 401 permits the portable terminal 300 to access the data stored in the secure area 420 only if the portable device 300 has succeeded in the mutual authentication with the authentication unit 403. When outputting the data stored in the secure area 420, the control unit 401 encrypts the data using the shared key received from the authentication unit 403.

Meanwhile, the control unit 401 permits the portable terminal 300 to access the data stored in the data area 410 without the mutual authentication.

1.4. Portable Terminal 300

Figure 5:
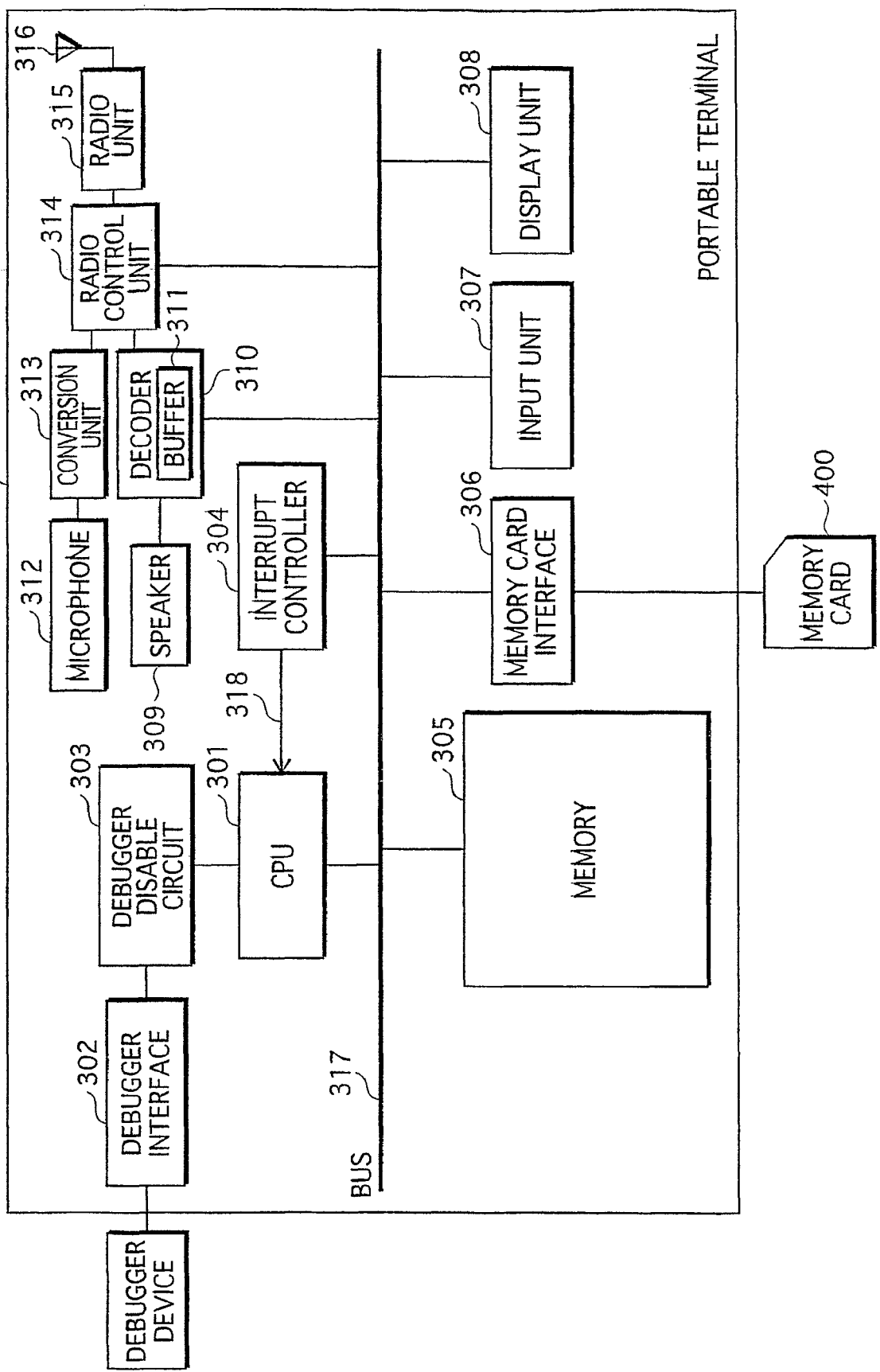
FIG. 5 is a block diagram showing a construction of a portable terminal shown in FIG. 1.

FIG. 5 shows a construction of the portable terminal 300. In the drawing, the portable terminal 300 includes a CPU 301, a debugger interface 302, a debugger disable circuit 303, an interrupt controller 304, a memory 305, a memory card interface 306, an input unit 307, a display unit 308, a speaker 309, a decoder 310, a microphone 312, a conversion unit 313, a radio control unit 314, a radio unit 315, and an antenna 316. These components of the portable terminal 303 are connected with a bus 317. Also, the interrupt controller 304 is connected to the CPU 301 by an interrupt line 318.

The following describes each of the components of the portable terminal 300.

(1) Debugger Disable Circuit 303 and Debugger Interface 302

The debugger disable circuit 303 is provided between the CPU 301 and the debugger interface 302, to connect/disconnect the CPU 301 and the debugger interface 302.

Upon receiving a debugger control signal indicating "enable" from the CPU 301, the debugger disable circuit 303 connects the CPU 301 to the debugger interface 302. Upon receiving a debugger control signal indicating "disable" from the CPU 301, the debugger disable circuit 303 disconnects the CPU 301 from the debugger interface 302.

When the CPU 301 and the debugger interface 302 are connected with each other, an external debugger device connected to the debugger interface 302 is enabled. If the CPU 301 and the debugger interface 302 are disconnected from each other, the debugger device is disabled. For example, the debugger disable circuit 303 can be realized by a switch. Here, the connection/disconnection between the CPU 301 and the debugger interface 302 may be made physically by means of a switch circuit or made electrically.

The debugger interface 302 is used for connecting the portable terminal 300 and the debugger device.

(2) Memory 305

Figure 6:
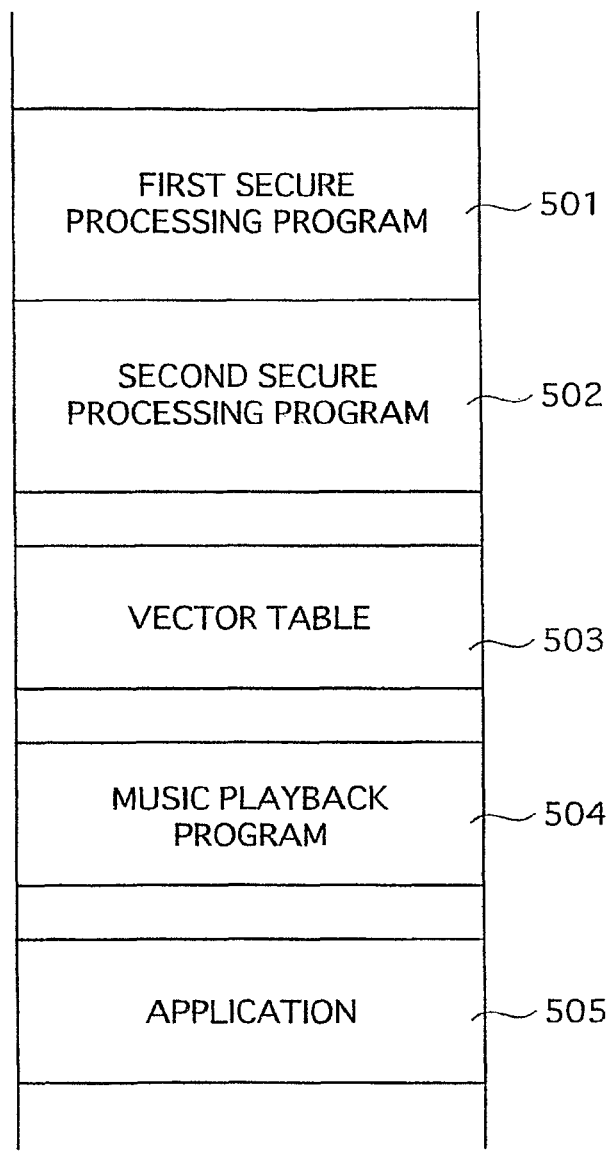
FIG. 6 shows programs stored in a memory shown in FIG. 5.

The memory 305 stores a first secure processing program 501, a second secure processing program 502, a vector table 503, a music playback program 504, and an application 505, as shown in FIG. 6.

(A) Second Secure Processing Program 502

The second secure processing program 502 is generated by the certificate authority device 100 and stored on the ROM by the ROM writer 200.

FIG. 7 shows the data structure of the second secure processing program 502. The following explains each of the programs constituting the second secure processing program 502.

(Area Allocation Program 511)

The area allocation program 511 allocates a memory space, in the memory 305, for dynamically allocating a memory area that is used when executing the authentication program 523 and the encrypted music data decryption program 524.

(Interrupt Disable Program 512)

The interrupt disable program 512 disables (i.e. masks) interrupts.

(Calling Program 513)

The calling program 513 calls the first secure processing program 501.

Figure 8:
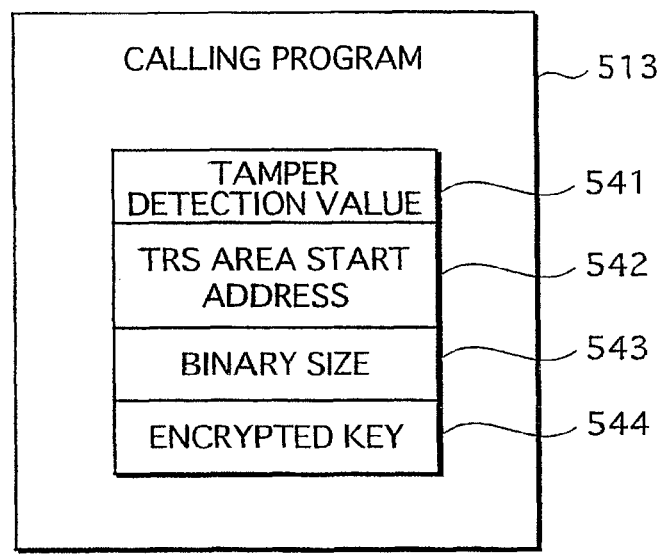
FIG. 8 shows a data structure of a calling program shown in FIG. 7.

The calling program 513 includes tamper detection data that is composed of a tamper detection value 541, a TRS area start address 542, a binary size 543, and an encrypted key 544, as shown in FIG. 8. When calling the first secure processing program 501, the calling program 513 also passes this tamper detection data embedded by the data embedment unit 105 of the certificate authority device 100, to the first secure processing program 501.

Here, the tamper detection value 541 is the hash value calculated by the hash value calculation unit 104 of the certificate authority device 100 for the TRS area program in the second secure processing program 502.

The TRS area start address 542 is the start address of the TRS area program which is subjected to hash value calculation, in the memory 305.

The binary size 543 is the binary size of the TRS area program.

The encrypted key 544 is the program key encrypted by the key encryption unit 103 of the certificate authority device 100 using the master key.

(Key Reception Program 514)

The key reception program 514 receives the program key from the first secure processing program 501, and passes the program key to the decryption program 516.

(Execution Flag 515)

The execution flag 515 shows whether the secure program is being executed or not. Immediately before the decryption program 516 decrypts the encrypted program 517, the execution flag 515 is set to ON indicating that the secure program is being executed. When the execution of the secure program obtained by decrypting the encrypted program 517 completes, the execution flag 515 is set to OFF.

(Decryption Program 516)

The decryption program 516 receives the program key from the key reception program 514, and decrypts the encrypted program 517 using the program key according to decryption algorithm D1 to obtain the secure program. Here, decryption algorithm D1 is an inverse of encryption algorithm E1.

For example, a technique disclosed in International Patent Application Publication No. WO04/013744 (published on Feb. 12, 2004) may be used for decrypting the encrypted program 517. According to this technique, the encrypted program 517 is loaded to a memory and decrypted in units of small portions. This prevents the whole secure program from existing on the memory. Accordingly, even when an unauthorized party accesses data in the memory, it cannot obtain the whole secure program.

(Encrypted Program 517)

The encrypted program 517 is generated by encrypting the secure program. The secure program includes an interrupt enable program 521, an area initialization program 522, an authentication program 523, the encrypted music data decryption program 524, an area key 525, an area encryption program 526, an area decryption program 527, and an area release program 528 shown in FIG. 7. In the encrypted program 517, the interrupt enable program 521, the area initialization program 522, the authentication program 523, the area key 525, the area encryption program 526, the area decryption program 527, and the area release program 528 protect the encrypted music data decryption program 524 from other programs.

(a) Interrupt Enable Program 521

The interrupt enable program 521 releases the disablement of interrupts made by the interrupt disable program 512.

(b) Area Initialization Program 522

The area initialization program 522 initializes the memory space a1 located by the area a1 location program 511, to allocate, in the memory space, a memory area which is subjected to encryption.

This memory area is allocated to write data that is used during execution of the authentication program 523 and the encrypted music data decryption program 524.

(c) Authentication Program 523

The authentication program 523 contains an authentication key 531.

The authentication program 523 performs one-way authentication to judge whether the first secure processing program 501 is valid.

(d) Encrypted Music Data Decryption Program 524

The encrypted music data decryption program 524 decrypts the encrypted music data 411 stored on the memory card 400 using the title key 421 according to decryption algorithm D1, to obtain the music data.

(e) Area Key 525

The area key 525 is used by the area encryption program 526 to encrypt the data in the memory area allocated by the area initialization program 522, and by the area decryption program 527 to decrypt the encrypted data in the memory area.

(f) Area Encryption Program 526

The area encryption program 526 encrypts the data in the memory area using the area key 525 according to encryption algorithm E2. Here, encryption algorithm E2 enables faster processing than encryption algorithm E1. As one example, encryption algorithm E2 is an XOR operation. Alternatively, algorithms other than an XOR operation may be used as encryption algorithm E2, which is determined based on the level of security required and the processing capacity of the CPU 301.

The area encryption program 526 encrypts the data in the memory area, before the second secure processing program 502 calls the first secure processing program 501 to transfer control to the first secure processing program 501.

(g) Area Decryption Program 527

The area decryption program 527 decrypts the encrypted data in the memory area using the area key 525 according to decryption algorithm D2 to obtain the original plaintext data, when control is returned from the first secure processing program 501 to the second secure processing program 502.

(h) Area Release Program 528

The area release program 528 releases the memory area allocated by the area initialization program 522, and calls an exit function of the first secure processing program 501 to end a music data playback procedure.

(Interrupt Handler 518)

The interrupt handler 518 is executed when an interrupt occurs during execution of the second secure processing program 502. The interrupt handler 518 contains an encryption/decryption key (not illustrated).

Figure 9:
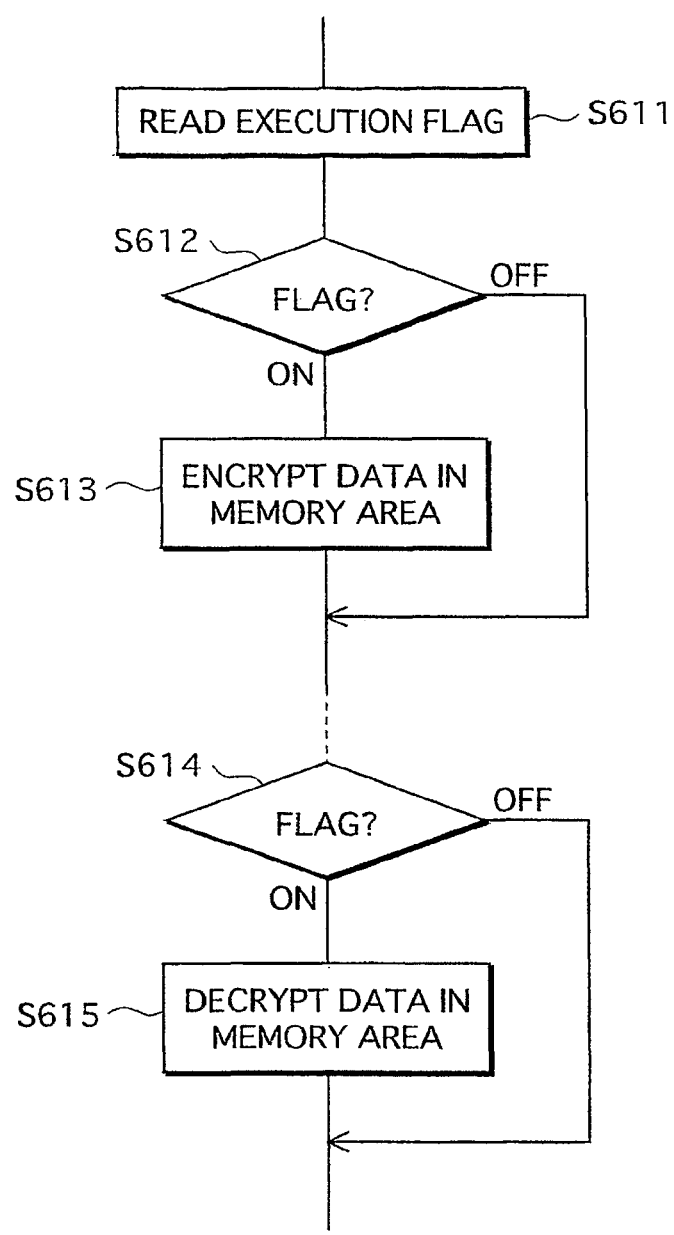
FIG. 9 is a flowchart showing a procedure of an interrupt handler shown in FIG. 7.

FIG. 9 is a flowchart showing a procedure of the interrupt handler 518. Though the interrupt handler 518 is actually a computer program, FIG. 9 illustrates the procedure of the interrupt handler 518 in flowchart for ease in explanation.

The interrupt handler 518 reads the execution flag 515 (S611), and judges whether the execution flag 515 is ON or OFF (S612). If the execution flag 515 is ON (S612:ON), the interrupt handler 518 encrypts the data in the memory area using the encryption/decryption key according to encryption algorithm E2 (S613). After this, the interrupt handler 518 processes the interrupt. If the execution flag 515 is OFF (S612:OFF), the interrupt handler 518 processes the interrupt without encrypting the data in the memory area.

After processing the interrupt, if the execution flag 515 is ON (S614:ON), the interrupt handler 518 decrypts the encrypted data in the memory area using the encryption/decryption key according to decryption algorithm D2 (S615), before returning to original processing. If the execution flag 515 is OFF (S614:OFF), the interrupt handler 518 returns to the original processing without decrypting the data in the memory area.

(B) First Secure Processing Program 501

Figure 10:
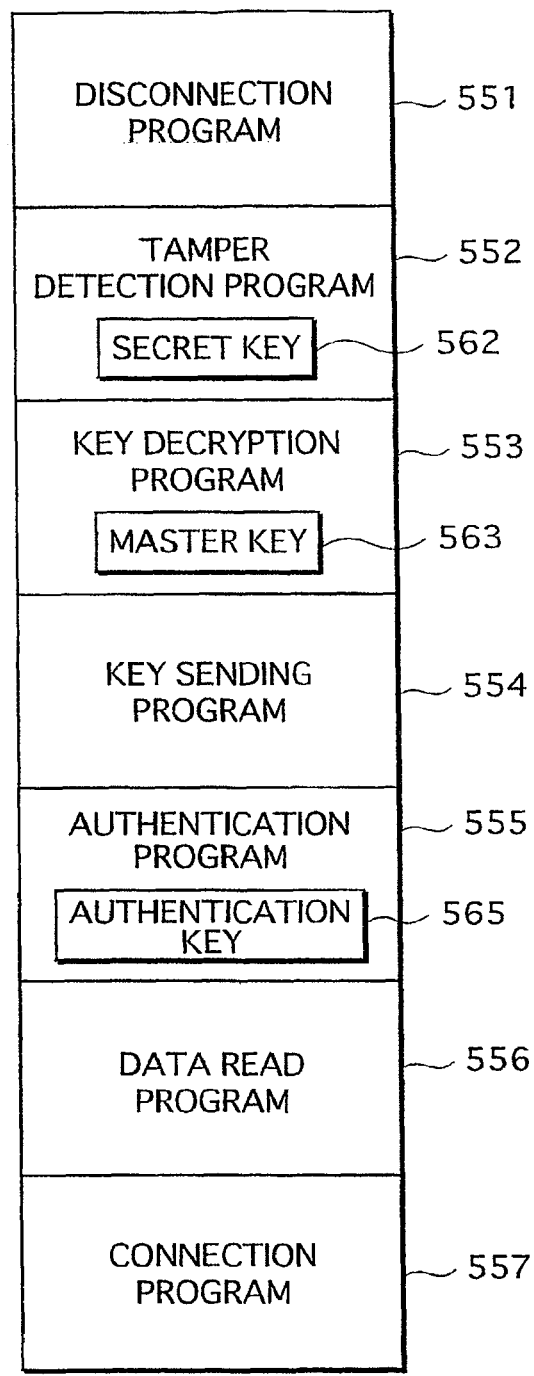
FIG. 10 shows a data structure of a first secure processing program shown in FIG. 6.

FIG. 10 shows a data structure of the first secure processing program 501. In the drawing, the first secure processing program 501 includes a disconnection program 551, a tamper detection program 552, a key decryption program 553, a key sending program 554, an authentication program 555, a data read program 556, and a connection program 557. The first secure processing program 501 is executed in a secure processing mode of the CPU 301. The secure processing mode is explained in detail later.

(Disconnection Program 551)

The disconnection program 551 outputs a debugger control signal indicating "disable" to the debugger disable circuit 303, when the first secure processing program 501 is started.

(Tamper Detection Program 552)

The tamper detection program 552 contains a secret key 562, and detects whether the second secure processing program 502 has been tampered with. To do so, the tamper detection program 552 acquires the tamper detection data including the tamper detection value 541, the TRS area start address 542, the binary size 543, and the encrypted key 544, from the calling program 513 of the second secure processing program 502.

The tamper detection program 552 reads an amount of data corresponding to the binary size 543 from a position on the memory 305 specified by the TRS area start address 542, as the TRS area program. The tamper detection program 552 calculates a hash value of the TRS area program using the secret key 562 according to the hash function. The tamper detection program 552 compares the calculated hash value and the tamper detection value 541. If the two values match, the tamper detection program 552 judges that the second secure processing program 502 has not been tampered with. If the two values do not match, the tamper detection program 552 judges that the second secure processing program 502 has been tampered with, and discontinues subsequent processing.

(Key Decryption Program 553)

The key decryption program 553 contains a master key 563. If the tamper detection program 552 judges that the second secure processing program 502 has not been tampered with, the key decryption program 553 decrypts the encrypted key 544 using the master key 563 according to decryption algorithm D1, to obtain the program key. The key decryption program 553 passes the program key to the key sending program 554.

(Key Sending Program 554)

The key sending program 554 receives the program key from the key decryption program 553, and sends the program key to the second secure processing program 502.

(Authentication Program 555)

The authentication program 555 contains an authentication key 565, and undergoes the authentication by the second secure processing program 502 using the authentication key 565. If the authentication is successful, the authentication program 555 establishes a shared session key with the second secure processing program 502. Data which is subsequently transferred between the first secure processing program 501 and the second secure processing program 502 is encrypted using this session key.

(Data Read Program 556)

The data read program 556 performs the mutual authentication with the memory card 400 based on CPRM. If the mutual authentication is successful, the data read program 556 accesses the secure area 420 of the memory card 400 and acquires the title key 421.

(Connection Program 557)

The connection program 557 outputs a debugger control signal indicating "enable", to the debugger disable circuit 303.

(C) Vector Table 503

FIG. 11 shows a data structure of the vector table 503. As illustrated, the vector table 503 shows addresses of instructions to be executed when a software interrupt, an abort, and a hardware interrupt occur.

(D) Music Playback Program 504

The music playback program 504 plays back the music data decrypted by the second secure processing program 502. The music playback program 504 outputs the music data to a buffer 311 in the decoder 310.

(E) Application 505

The application 505 receives an input of a user operation. If the user operation is to play back the music data on the memory card 400, the application 505 starts the second secure processing program 502.

(3) CPU 301

The CPU 301 operates according to the programs stored in the memory 305. The operation of the CPU 301 is controlled by an instruction issued from the debugger device connected with the debugger interface 302.

Figure 12:
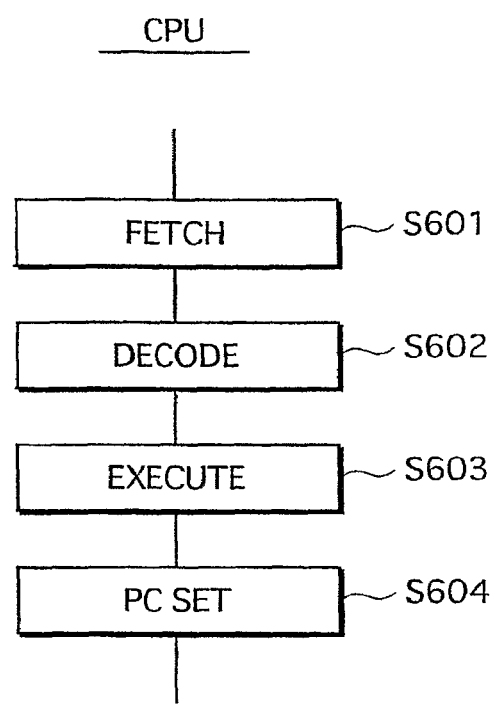
FIG. 12 is a flowchart showing an operation of a CPU shown in FIG. 5.
Figure 13:
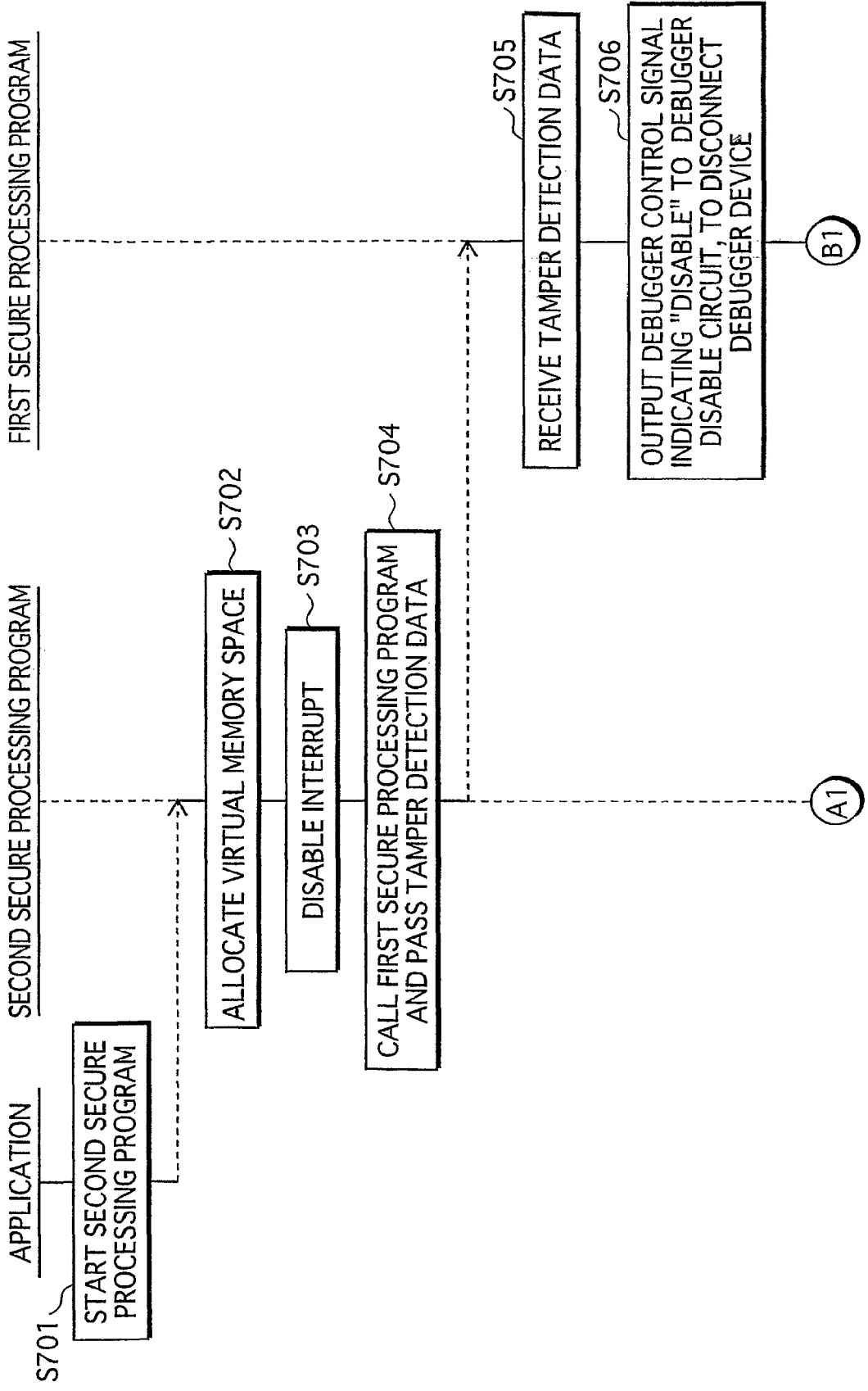
FIG. 13 is a flowchart showing a music data playback procedure.
Figure 14:
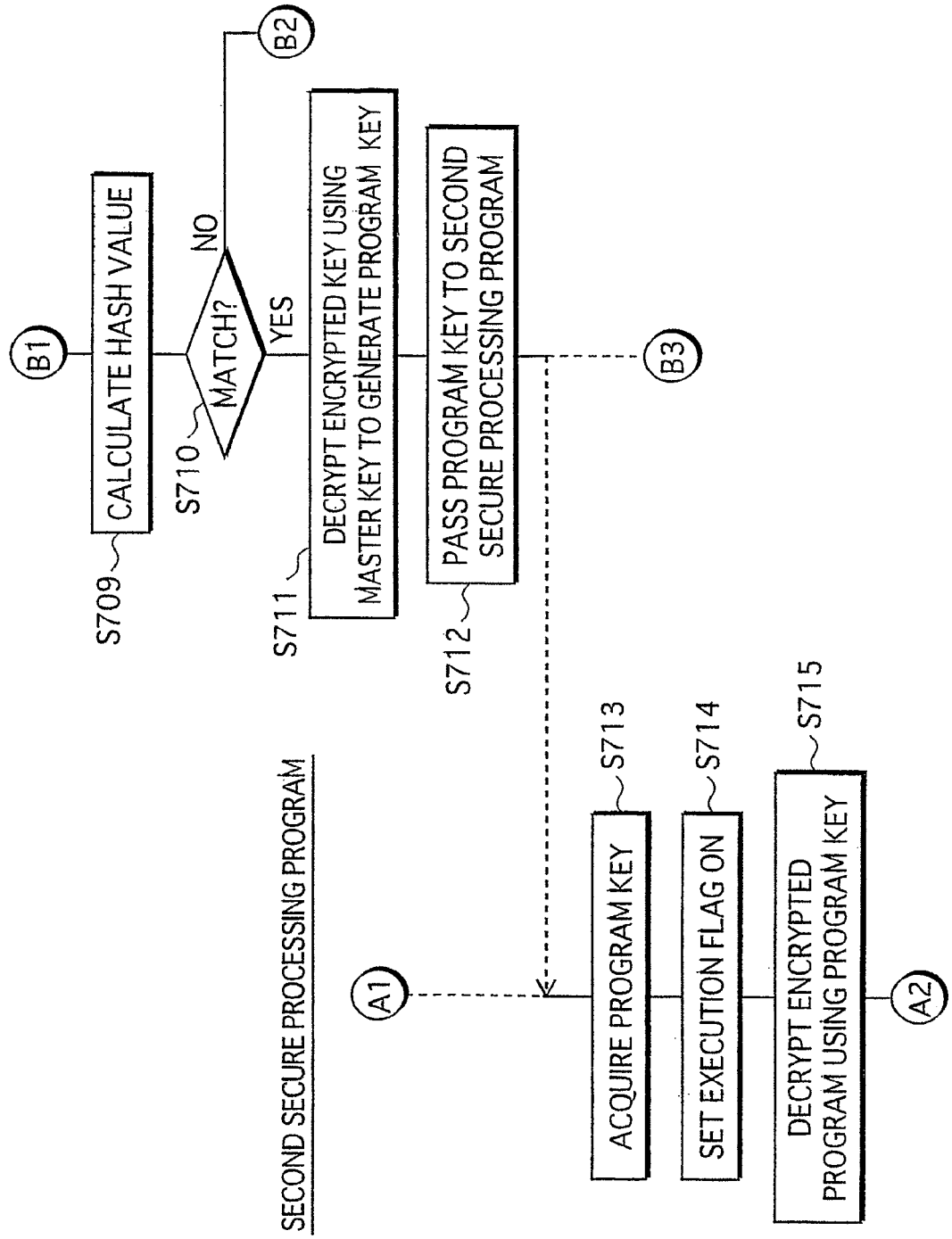
FIG. 14 is a flowchart showing the music data playback procedure.
Figure 15:
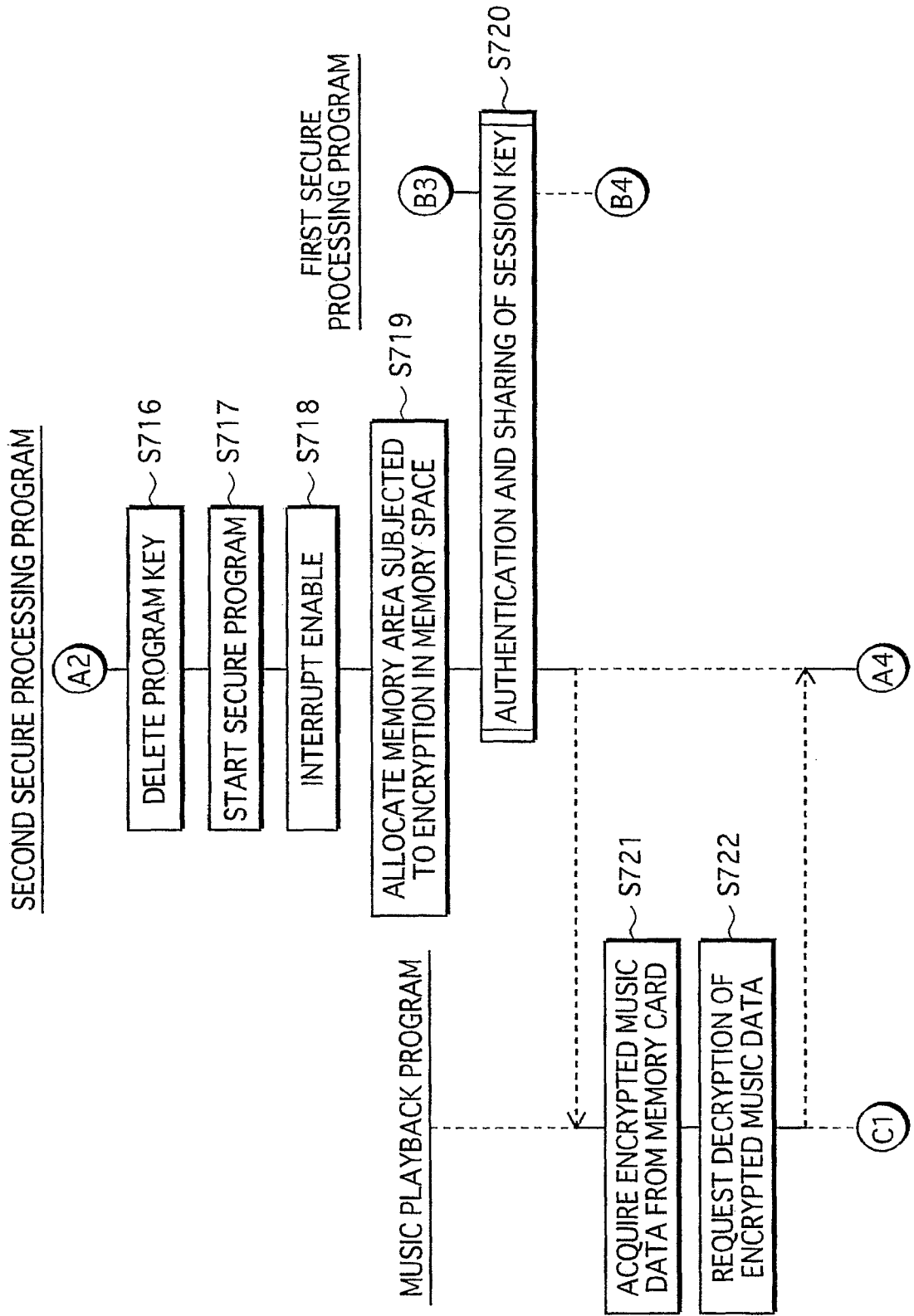
FIG. 15 is a flowchart showing the music data playback procedure.
Figure 16:
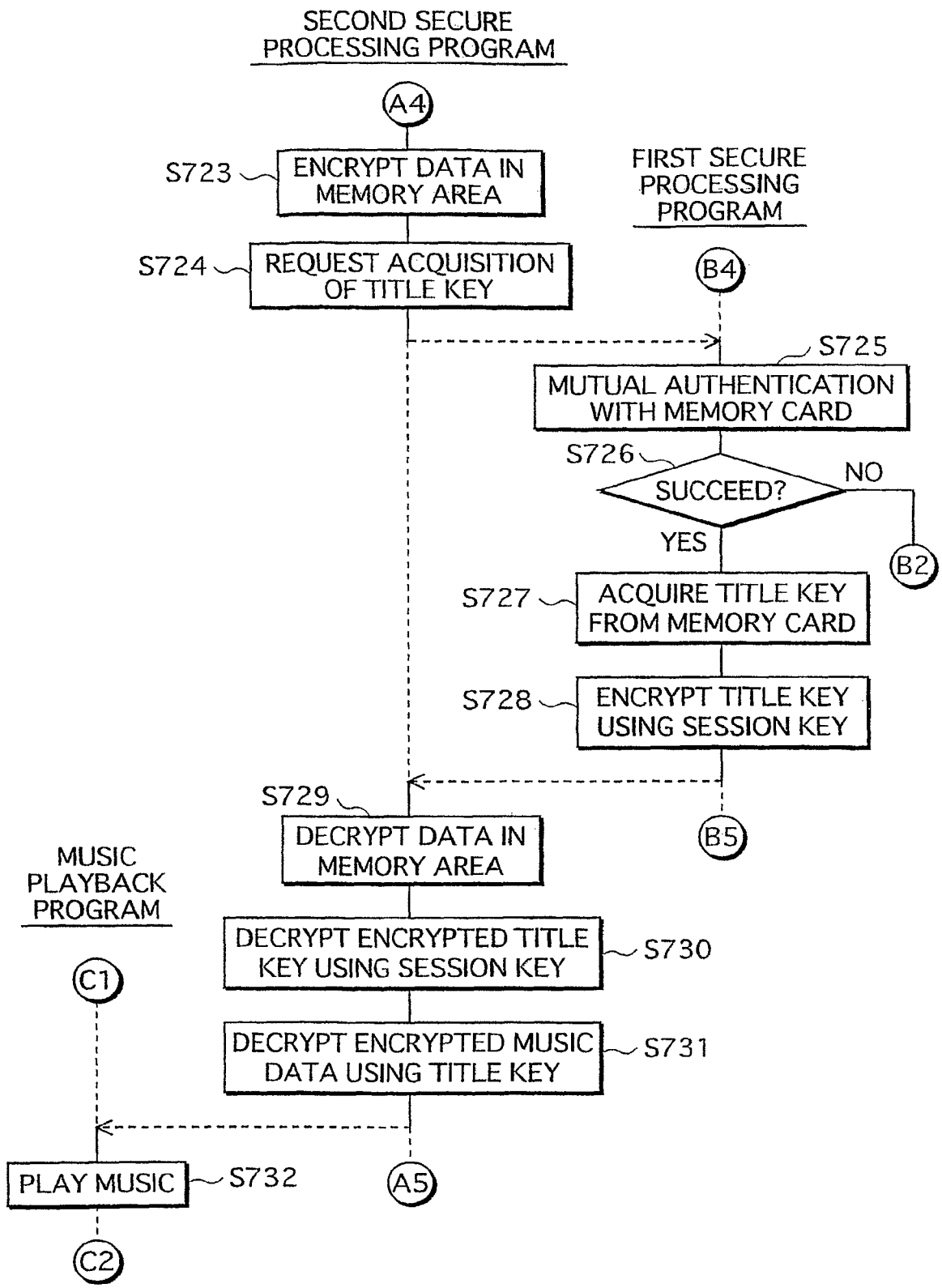
FIG. 16 is a flowchart showing the music data playback procedure.
Figure 17:
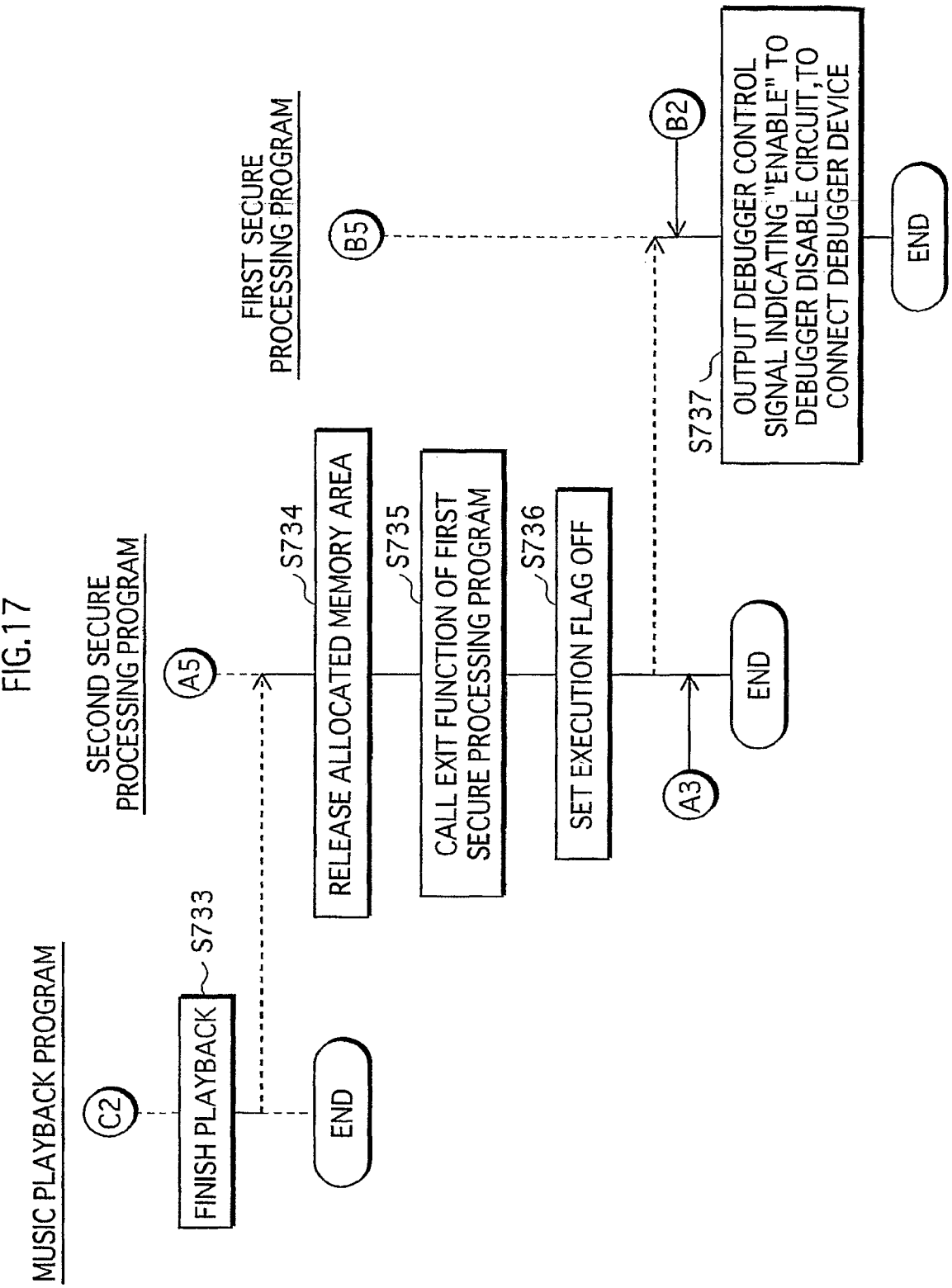
FIG. 17 is a flowchart showing the music data playback procedure.

FIG. 12 is a flowchart showing an operation of the CPU 301. The CPU 301 fetches an instruction of a program stored in the memory 305 (S601), decodes the instruction (S602), and executes it (S603). The CPU 301 then increments a program counter (S604) to fetch the next instruction.

Here, the CPU 301 operates in the secure processing mode or a normal processing mode. In the normal processing mode, the CPU 301 performs normal processing. In the secure processing mode, the CPU 301 performs processing with a high level of security so that data in the memory 305 cannot be accessed from outside.

The CPU 301 executes the first secure processing program 501 in the secure processing mode, and the second secure processing program 502 in the normal processing mode.

When an interrupt occurs, the interrupt controller 304 outputs an interrupt signal via the interrupt line 318. If interrupts are disabled by the interrupt disable program 512, the CPU 301 refuses the interrupt signal. If interrupts are not disabled, the CPU 301 accepts the interrupt signal, refers to the vector table 503 shown in FIG. 11, and reads an address corresponding to the interrupt signal. The CPU 301 processes an interrupt according to an interrupt handler at the read address. Having processed the interrupt, the CPU 301 returns to original processing.

When receiving an interrupt signal during execution of the second secure processing program 502, the CPU 301 refers to the vector table 503 and executes the interrupt handler 518 shown in FIG. 9.

(4) Input Unit 307

The input unit 307 receives an input of a user operation.

Upon receiving the input, the input unit 307 notifies the interrupt controller 304 of an interrupt.

(5) Interrupt Controller 304

The interrupt controller 304 outputs an interrupt signal to the CPU 301 via the interrupt line 318, when the input unit 307 or the radio control unit 314 notifies the interrupt controller 304 of an interrupt such as a mail reception, a call reception, or a user operation.

(6) Speaker 309 and Decoder 310

The decoder 310 includes the buffer 311. The buffer 311 buffers music data received from the CPU 301. The speaker 309 generates an audio signal from the music data in the buffer 311, and outputs the audio signal.

(7) Memory Card Interface 306

The memory card interface 306 is used to connect the portable terminal 300 and the memory card 400. The memory card interface 306 outputs data to the memory card 400, and receives data from the memory card 400 and outputs it to the CPU 301, under control of the CPU 301.

(8) Radio Control Unit 314, Radio Unit 315, and Antenna 316

The antenna 316, the radio unit 315, and the radio control unit 314 send/receive a sound or information with a device to which the portable terminal 300 is connected via a radio base station and a portable terminal network.

When receiving a mail or a call via the antenna 316 and the radio unit 315, the radio control unit 314 notifies the interrupt controller 304 of an interrupt.

(9) Microphone 312 and Conversion Unit 313

The conversion unit 313 converts a sound received from the microphone 312 to an electrical signal, and outputs it to the radio control unit 314.

2. Operation of the Secure Processing System 1

2.1. Operation of the Certificate Authority Device 100

The compiler 101 receives an input of source code of the calling program 513 and source code of the protection program, and compiles the source code to binary data of the calling program 513 and binary data of the protection program. The compiler 101 outputs the binary data to the data embedment unit 105. The compiler 101 also receives an input of source code of the decryption program 516 and source code of the secure program, and compiles the source code to binary data of the decryption program 516 and binary data of the secure program. The compiler 101 outputs the binary data to the program encryption unit 102.

The program encryption unit 102 receives the binary data of the decryption program 516 and the binary data of the secure program. The program encryption unit 102 also receives the program key. The program encryption unit 102 encrypts the secure program using the program key, to generate the encrypted program 517. The program encryption unit 102 outputs the decryption program 516 and the encrypted program 517 to the data embedment unit 105 and the hash value calculation unit 104, as the TRS area program.

The hash value calculation unit 104 receives the TRS area program. The hash value calculation unit 104 also receives the secret key. The hash value calculation unit 104 calculates a hash value of the TRS area program using the secret key according to the hash function. The hash value calculation unit 104 also calculates the binary size of the TRS area program. The hash value calculation unit 104 outputs the hash value and the binary size to the data embedment unit 105.

The key encryption unit 103 receives the program key and the master key, and encrypts the program key using the master key to generate the encrypted key. The key encryption unit 103 outputs the encrypted key to the data embedment unit 105.

The data embedment unit 105 receives the binary data of the calling program 513 from the compiler 101, the hash value and the binary size from the hash value calculation unit 104, and the encrypted key from the key encryption unit 103. The data embedment unit 105 embeds the hash value in the calling program 513 as the tamper detection value 541. The data embedment unit 105 also embeds the binary size and the encrypted key in the calling program 513 as the binary size 543 and the encrypted key 544. The data embedment unit 105 further receives the binary data of the protection program from the compiler 101, and the TRS area program from the program encryption unit 102. The data embedment unit 105 includes the calling program 513 in the protection program, and combines the protection program and the TRS area program to form the second secure processing program 502. The data embedment unit 105 writes the second secure processing program 502 to the storage unit 106.

The transmission unit 107 reads the second secure processing program 502 from the storage unit 106, and outputs the second secure processing program 502 to the ROM writer 200.

2.2. Music Data Playback Operation of the Portable Terminal (1) Playback

An operation of playing back the music data recorded on the memory card 400 by the portable terminal 300 through execution of programs is explained below, with reference to FIGS. 13 to 17.

Upon receiving an input of a user operation to play back the music data on the memory card 400 via the input unit 307, the application 505 starts the second secure processing program 502 (S701).

In the second secure processing program 502, the area allocation program 511 allocates a virtual memory space for dynamically allocating a memory area during execution of the secure program, in the memory 305 (S702). Also, the interrupt disable program 512 disables interrupts (S703). In this way, unauthorized program analysis and alteration using interrupts are prohibited. The disablement of interrupts is valid until an interrupt enable. Next, the calling program 513 calls the first secure processing program 501, and passes the tamper detection data made up of the tamper detection value 541, the TRS area start address 542, the binary size 543, and the encrypted key 544 to the first secure processing program 501 (S704).

The first secure processing program 501 receives the tamper detection data from the second secure processing program 502 (S705). In the first secure processing program 501, the disconnection program 551 outputs a debugger control signal indicating "disable" to the debugger disable circuit 303 (S706). As a result, the debugger disable circuit 303 disconnects the debugger device. In this way, unauthorized program analysis and alteration using the debugger device are prohibited.

Next, the tamper detection program 552 performs the following procedure.

The tamper detection program 552 reads an amount of data corresponding to the binary size 543 from a position on the memory 305 specified by the TRS area start address 542, as the TRS area program. The tamper detection program 552 calculates a hash value of the TRS area program using the secret key 562 (S709).

The tamper detection program 552 compares the calculated hash value with the tamper detection value 541 (S710). If the two values do not match (S710:NO), the tamper detection program 552 judges that the second secure processing program 502 has been tampered with, and discontinues subsequent processing. The connection program 557 outputs a debugger control signal indicating "enable" to the debugger disable circuit 303 (S737), and terminates the operation.

If the two values match (S710:YES), the tamper detection program 552 judges that the second secure processing program 502 has not been tampered with. Accordingly, the key decryption program 553 decrypts the encrypted key 544 using the master key 563, to obtain the program key (S711). The key decryption program 553 passes the program key to the key sending program 554. The key sending program 554 passes the program key to the second secure processing program 502 (S712).

In the second secure processing program 502, the key reception program 514 receives the program key (S713). Also, the execution flag 515 is set to ON (S714). After this, the decryption program 516 decrypts the encrypted program 517 using the program key, to obtain the secure program (S715). Having done so, the decryption program 516 deletes the program key (S716).

The secure program performs the following procedure (S717).

In the secure program, the interrupt enable program 521 releases the disablement of interrupts made in step S703 (S718). Subsequently, if an interrupt occurs, the secure program is suspended to process the interrupt. A procedure to be performed when an interrupt occurs is explained in detail later.

Next, the area initialization program 522 allocates a memory area in which data used by the authentication program 523 and the encrypted music data decryption program 524 is to be stored, in the memory space (S719).

The authentication program 523 authenticates the first secure processing program 501 according to an authentication procedure (described later) (S720). The authentication program 555 in the first secure processing program 501 undergoes the authentication by the authentication program 523. If the authentication has failed, the second secure processing program 502 discontinues subsequent processing, and the connection program 557 in the first secure processing program 501 outputs a debugger control signal indicating "enable" to the debugger disable circuit 303 (S737) before terminating the operation.

If the authentication has succeeded, the second secure processing program 502 and the first secure processing program 501 establish a shared session key. Data which is subsequently transferred between the second secure processing program 502 and the first secure processing program 501 is encrypted using this session key.

If the authentication has succeeded, the second secure processing program 502 transfers control to the music playback program 504.

The music playback program 504 reads the encrypted music data 411 from the memory card 400 (S721). The music playback program 504 also requests the second secure processing program 502 to decrypt the encrypted music data 411 (S722).

Upon receiving the request to decrypt the encrypted music data 411, the second secure processing program 502 calls the area encryption program 526. The area encryption program 526 encrypts the data in the memory area allocated in step S719, using the area key 525 (S723). After this, the second secure processing program 502 requests the first secure processing program 501 to acquire the title key 421 (S724).

In the first secure processing program 501, the data read program 556 performs mutual authentication with the authentication unit 403 in the memory card 400 (S725). If the mutual authentication has succeeded (S726:YES), the data read program 556 accesses the secure area 420 in the memory card 400 and acquires the title key 421 (S727). If the mutual authentication has failed, the data read program 556 cannot acquire the title key 421. In this case, the connection program 557 outputs a debugger control signal indicating "enable" to the debugger disable circuit 303 (S737), before terminating the operation.

The first secure processing program 501 encrypts the title key 421 using the session key, to generate an encrypted title key (S728). The first secure processing program 501 passes the encrypted title key to the second secure processing program 502.

In the second secure processing program 502, the area decryption program 527 decrypts the encrypted data in the memory area using the area key 525, to recover the original data (S729). The authentication program 523 decrypts the encrypted title key using the session key, to obtain the title key 421 (S730). Following this, the encrypted music data decryption program 524 decrypts the encrypted music data 411 read from the memory card 400 by the music playback program 504, using the title key 421 (S731). As a result, the music data is obtained. The encrypted music data decryption program 524 passes the music data to the music playback program 504.

The music playback program 504 plays back the music data (S732).

Once the playback of the music data has completed (S733), the music playback program 504 transfers control to the second secure processing program 502. In the second secure processing program 502, the area release program 528 releases the memory area allocated in step S719 (S734), and calls an exit function of the first secure processing program 501 (S735). Also, the execution flag 515 is set to OFF (S736).

In the first secure processing program 501, the connection program 557 outputs a debugger control signal indicating "enable" to the debugger disable circuit 303 (S737), before terminating the operation.

(2) Authentication

Figure 18:
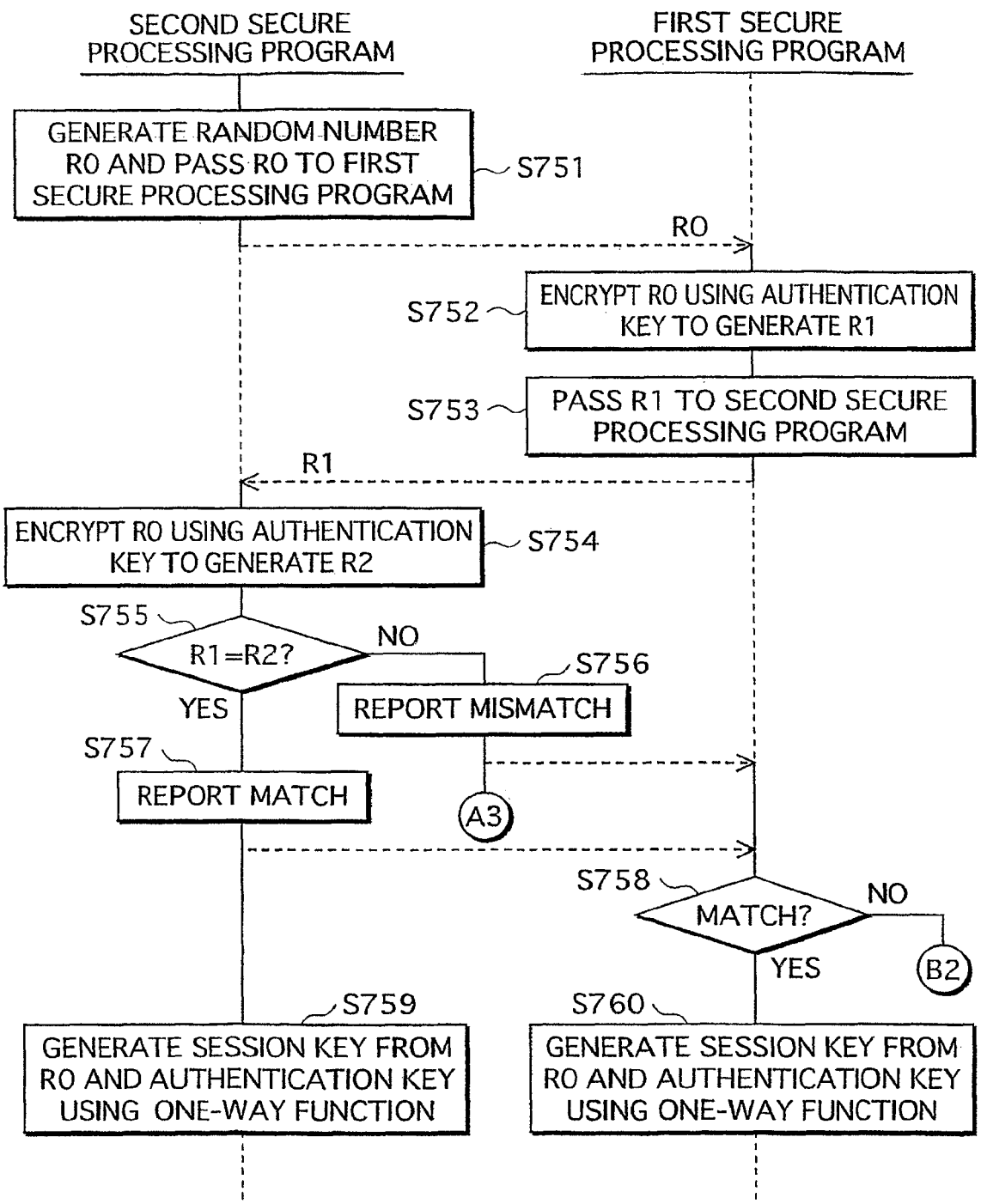
FIG. 18 is a flowchart showing an authentication procedure.

The procedure of authenticating the first secure processing program 501 by the second secure processing program 502 in step S720 is explained below, with reference to FIG. 18.

The second secure processing program 502 generates random number R0, and passes random number R0 to the first secure processing program 501 (S751).

The first secure processing program 501 receives random number R0, and encrypts random number R0 using the authentication key 565 to generate authentication value R1 (S752). The first secure processing program 501 passes authentication value R1 to the second secure processing program 502 (S753).

The second secure processing program 502 receives authentication value R1 from the first secure processing program 501. The second secure processing program 502 encrypts random number R0 using the authentication key 531, to generate authentication value R2 (S754). The second secure processing program 502 compares authentication value R1 with authentication value R2 (S755). If the two values do not match (S755:NO), the second secure processing program 502 passes a judgment result indicating "mismatch" to the first secure processing program 501 (S756), and terminates the procedure. If the two value match (S755: YES), the second secure processing program 502 passes a judgment result indicating "match" to the first secure processing program 501 (S757). The second secure processing program 502 then generates the session key from random number R0 and authentication key 531 using a one-way function (S759).

If the received judgment result indicates "mismatch" (S758:NO), the first secure processing program 501 terminates the procedure. If the received judgment result indicates "match" (S758:YES), the first secure processing program 501 generates the session key from random number R0 and authentication key 565 using the one-way function (S760).

Thus, the second secure processing program 502 authenticates the first secure processing program 501, and shares the session key if the authentication is successful. Data which is subsequently transferred between the first secure processing program 501 and the second secure processing program 502 is encrypted using this session key.

(3) Interrupt

Figure 19:
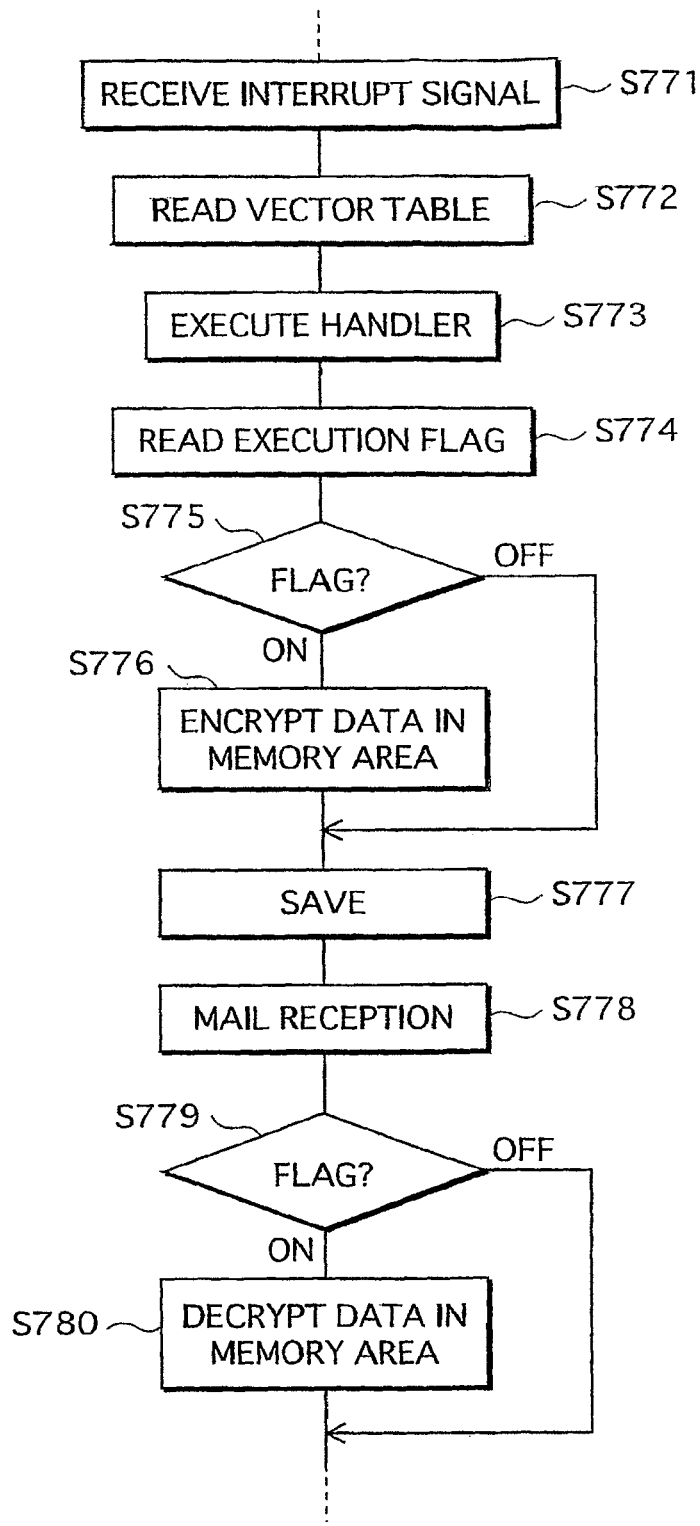
FIG. 19 is a flowchart showing an operation of the CPU when an interrupt occurs.

The operation of the CPU 301 when an interrupt occurs during execution of the second secure processing program 502 is explained below, with reference to FIG. 19. Here, the interrupt is a mail reception as one example.

Upon receiving an interrupt signal from the interrupt controller 304 (S771), the CPU 301 reads the vector table 503 (S772), and executes the interrupt handler 518 according to the vector table 503 (S773).

First, the CPU 301 reads the execution flag 515 (S774). If the execution flag 515 is ON (S775:ON), the CPU 301 encrypts the data in the memory area using the encryption/decryption key (S776). The CPU 301 also saves a context (S777), and performs a mail reception process (S778). If the execution flag 515 is OFF (S775:OFF), the CPU 301 performs steps S777 and S778 without encrypting the data in the memory area.

After the mail reception process, if the execution flag 515 is ON (S779:ON), the CPU 301 decrypts the data in the memory area (S780), before returning to original processing.

If the execution flag 515 is OFF (S779:OFF), the CPU 301 returns to the original processing without decrypting the data in the memory area.

3. Modifications

The present invention has been described by way of the above embodiment, though it should be obvious that the present invention is not limited to the above. Example modifications are given below.

(1) The above embodiment describes an example of protecting an encrypted music data decryption program which is executed by a portable terminal, though the present invention is not limited to such.

Example devices which execute a program to be protected include a DVD player, a DVD recorder, a PC, and a PDA.

Also, example programs to be protected include a decryption program used when playing back video content or a game on a portable terminal, and a recording program used when recording content on a DVD recorder. Thus, the present invention is applicable to any program that need be protected against unauthorized analysis and alteration.

(2) The above embodiment describes the case where a hash value is used as the tamper detection value, though any value that is unique to the TRS area program can be used as the tamper detection value. For instance, a digital signature for the TRS area program or data generated by encrypting the TRS area program may be used as the tamper detection value. Also, algorithms other than the one used in the embodiment may be employed to calculate the hash value.

The above embodiment describes the case where the tamper detection value is generated for the TRS area program, but the tamper detection value may instead be generated for at least one part of the TRS area program. Alternatively, the tamper detection value may be generated for at least one part of the second secure processing program.

Also, the tamper detect ion may be carried out by performing matching for at least one part of the TRS area program or the second secure processing program, or by embedding a psuedo-random number in at least one part of the TRS area program or the second secure processing program. In other words, any tamper detection method that can detect whether a program has been tampered with is applicable.

The above embodiment describes the case where the tamper detection is performed after the debugger disable circuit disconnects the debugger device. As an alternative, the tamper detection may be performed before the disconnection by the debugger disable circuit. In such a case, if no tampering is detected, the debugger disable circuit disconnects the debugger device to proceed to subsequent processing.

(3) The above embodiment describes the case where the calling program in the second secure processing program passes the tamper detection data to the first secure processing program. As an alternative, a program other than the second secure processing program may pass the tamper detection data to the first secure processing program. In this case, the calling program in the second secure processing program only calls the first secure processing program. Meanwhile, a sending program for sending the tamper detection data to the first secure processing program is stored in the memory 305. This being so, upon being called by the second secure processing program, the first secure processing program requests the sending program to send the tamper detection data. The sending program responsively sends the tamper detection data to the first secure processing program.

In such a case, the certificate authority device does not include this sending program in the protection program of the second secure processing program, but generates it separately from the second secure processing program.

Also, the first secure processing program may contain the tamper detection data of the second secure processing program beforehand.

(4) The above embodiment describes the case where the second secure processing program performs one-way authentication on the first secure processing program, but the second secure processing program and the first secure processing program may perform two-way authentication. Also, the above embodiment describes the use of a challenge-response authentication method, though other authentication methods for authenticating a program can equally be used.

The above embodiment describes the case where authentication values R1 and R2 are generated by encrypting random number R0 using the authentication key, but they may instead be generated by applying a one-way function to random number R0.

The above embodiment describes the case where the session key is generated from random number R0 and the authentication key using a one-way function, though the session key may instead be generated by encryption.

(5) The above embodiment describes the case where the area encryption program encrypts the data in the memory area before control is transferred from the second secure processing program to the first secure processing program. The area encryption program may also encrypt the data in the memory area to protect the data, when control is transferred from the second secure processing program to another program such as when the second secure processing program calls an external function.

In such a case, when control is returned to the second secure processing program, the area decryption program decrypts the encrypted data in the memory area to recover the original data.

(6) A unique master key may be assigned to each device which executes a program to be protected. In this case, even if an unauthorized user steals a master key of one device and attempts to attack other devices using the master key, the unauthorized user cannot operate the other devices properly. This minimizes damage caused by unauthorized acts.

(7) The above embodiment describes the case where the first secure processing program and the second secure processing program each contain the authentication key. Alternatively, the authentication key may be calculated based on the program key or the tamper detection value.

Also, the certificate authority device may encrypt the authentication key using the master key. In this case, the program key for decrypting the encrypted program can be calculated based on the authentication key.

When the key used for authentication and the key used for decryption of the encrypted program have a dependency relationship in this way, any of the keys may be encrypted. Further, multiple encryption stages may be performed using a greater number of keys, such as by encrypting the encrypted key using another key.

(8) The present invention also applies to the method described above. This method may be realized by a computer program that is executed by a computer. Such a computer program may be distributed as a digital signal.

The present invention may be realized by a computer-readable storage medium, such as a flexible disk, a hard disk, a CD-ROM, an MO, a DVD, a DVD-ROM, a DVD-RAM, a BD, or a semiconductor memory, on which the computer program or digital signal mentioned above is recorded. Conversely, the present invention may also be realized by the computer program or digital signal that is recorded on such a storage medium.

The computer program or digital signal that achieves the present invention may also be transmitted via a network, such as an electronic communications network, a wired or wireless communications network, or the Internet.

The present invention can also be realized by a computer system that includes a microprocessor and a memory. In this case, the computer program can be stored in the memory, with the microprocessor operating in accordance with this computer program.

The computer program or digital signal may be provided to an independent computer system by distributing a storage medium on which the computer program or digital signal is recorded, or by transmitting the computer program or digital signal via a network. The independent computer system may then execute the computer program or digital signal to function as the present invention.

(8) The above embodiment and modifications may be freely combined.

The present invention can be used recurrently and continuously in software industries which provide software such as computer programs and digital content of movies, music, and the like. Also, the present invention can be manufactured and sold in manufacturing industries of electrical products and the like.

The invention claimed is:

1. An information processing device comprising:
   a processor circuit to execute a first program for tamper detection, and execute a second program for executing a task; and
   a memory circuit where at least part of the second program is loaded,
   wherein the first program loads at least part of the second program and judges whether or not at least part of the second program is tampered with in a secure environment and the secure environment cannot be accessed outside of the secure environment.

2. The information processing device according to claim 1, wherein the first program for tamper detection is a program for detecting a tampering by using a digital signature.

3. The information processing device according to claim 1, wherein the processor circuit executes the first program in the secure environment, and executes the second program in a normal environment.

4. The information processing device according to claim 1, wherein the secure environment is a higher security level than a normal environment in which the second program is executed.

5. A method for operating an information processing device having a processor and a hardware memory, the method comprising the steps of:
   processing by the processor, a first program for tamper detection, and a second program for executing a task;
   loading by the first program, in the hardware memory, at least the second program,
   judging by the first program whether or not at least part of the second program is tampered with in a secure environment,
   wherein the secure environment cannot be accessed outside of the secure environment.

6. The method according to claim 5, wherein the first program for tamper detection is a program for detecting a tampering by using a digital signature.

7. The method according to claim 5, wherein the processor is configured to execute the first program in the secure environment, and execute the second program in a normal environment.

8. The method according to claim 5, wherein the secure environment is a higher security level than a normal environment in which the second program is executed.

\* \* \* \* \*